Aug. 20, 1968 R. L. THOMAS 3,398,234

MULTIPLE ADDRESS CIRCUIT

Filed Aug. 4, 1964 19 Sheets-Sheet 1

INVENTOR
R. L. THOMAS
BY
ATTORNEY

Aug. 20, 1968 R. L. THOMAS 3,398,234

MULTIPLE ADDRESS CIRCUIT

Filed Aug. 4, 1964 19 Sheets-Sheet 2

Aug. 20, 1968 R. L. THOMAS 3,398,234

MULTIPLE ADDRESS CIRCUIT

Filed Aug. 4, 1964 19 Sheets-Sheet 4

MULTIPLE ADDRESS CIRCUIT

Aug. 20, 1968 R. L. THOMAS 3,398,234

MULTIPLE ADDRESS CIRCUIT

Filed Aug. 4, 1964 19 Sheets-Sheet 13

MULTIPLE ADDRESS CIRCUIT

Filed Aug. 4, 1964 19 Sheets-Sheet 17

United States Patent Office
3,398,234
Patented Aug. 20, 1968

3,398,234
MULTIPLE ADDRESS CIRCUIT

Robert L. Thomas, Los Angeles, Calif., assignor to American Telephone and Telegraph Company, New York, N.Y., a corporation of New York Filed Aug. 4, 1964, Ser. No. 387,339
7 Claims. (Cl. 178—3)

ABSTRACT OF THE DISCLOSURE

A multiple address circuit providing a method of distributing a data message to a plurality of addressees. The circuit includes a two way trunk which terminates in a modified PBX. When selectively called by a data subscriber via the PBX, the trunk circuit returns dial tone and connects a register which can store up to six addresses. After the last digit is dialed, a magnetic tape recorder is cut through and the data message is recorded thereon. When the originating subscriber thereafter hangs up, the multiple address circuit proceeds to originate a call through the PBX to the first addressee and transmit the message when the first addressee answers. When the message delivery is concluded the addressee station is disconnected and the multi-address circuit thereupon originates calls to each of the subsequent addressee stations in the same manner.

Figure 1:
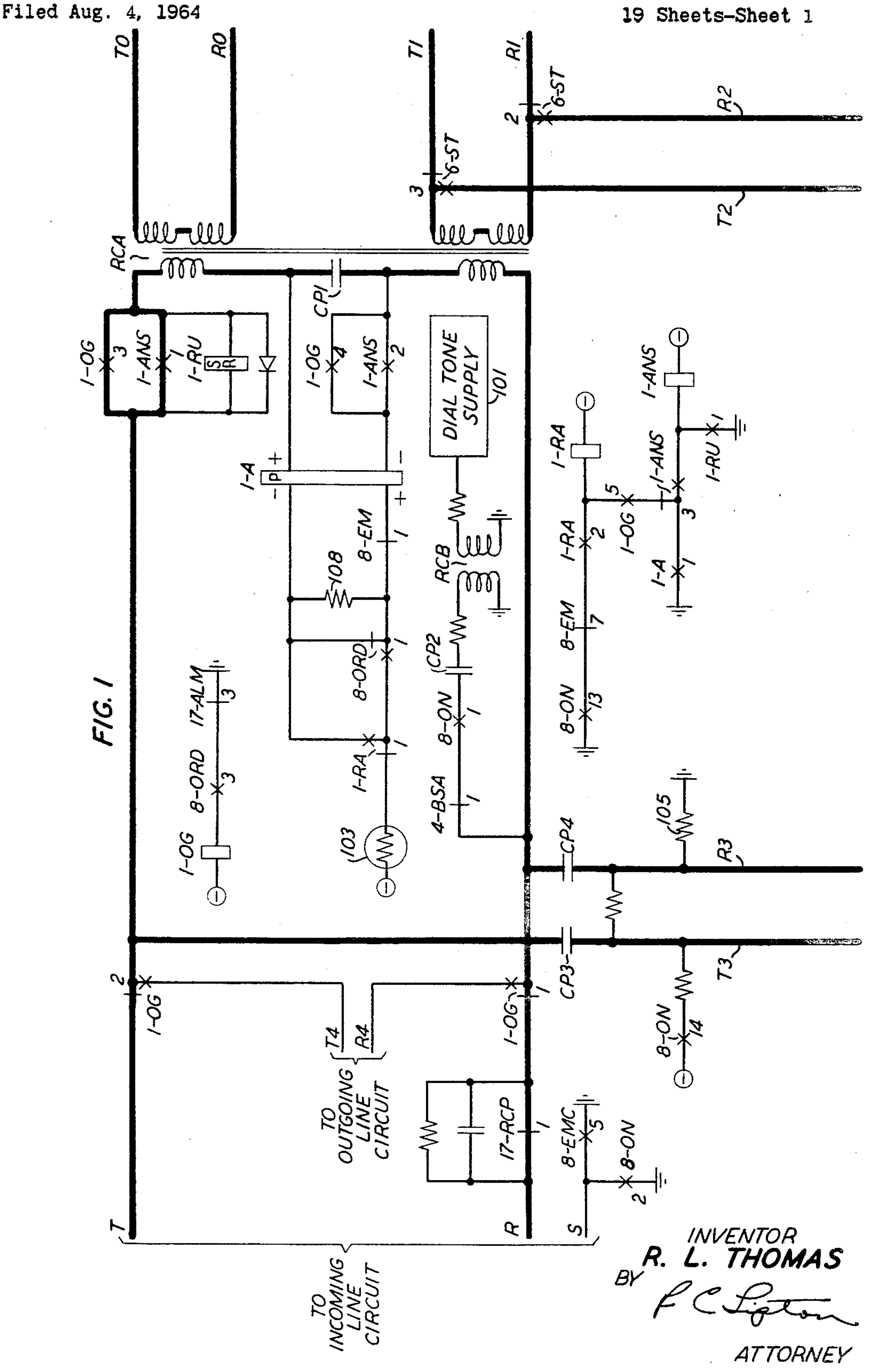

This invention relates to a multiple address circuit and, more particularly, to a system for distributing a data message to a plurality of stations.

A broad object of this invention is to provide an improved multiple address circuit.

Automatic switching systems for processing data messages are generally classified as either message switching systems or line switching systems. In message switching, the data message includes routing codes designating the destination station or stations. At the switching office, the data message is stored and the routing codes are examined to provide the switching information for seizing the appropriate outlet or outlets. The stored message is then retransmitted to the seized outlets and thus to the destination stations. In line switching, the connection to the destination station is completed before the data message is transmitted by the originating station. This conforms with conventional telephone switching practices wherein the calling subscriber first sends the digits of the called subscriber and proceeds to communicate only after the called subscriber answers the call.

In Patent 3,113,176, which issued to T. L. Doktor et al. on Dec. 3, 1963, there is disclosed a subscriber data set arranged to communicate via a line switching system. Specifically, the subscriber set is connected to the telephone switching network and includes means for sending digits to effect a connection by way of a central telephone office. When the connection is established, the called subscriber returns an answering signal enabling the originating subscriber to initiate data transmission over the telephone line facilities. The subscriber set may also be connected to a line switching system known as a PBX (private branch exchange), an arrangement disclosed, for example, in Patent 2,949,506, which issued to H. H. Abbott et al. on Aug. 16, 1690, and in the copending application of R. M. Green et al., Serial No. 387,331, filed concurrently herewith, which issued as Patent 3,344,-235, on Sept. 26, 1967, the latter application disclosing a PBX subscriber line extending to a data set.

In message switching systems, one of the features that may be provided is a multiple address circuit for distributing a data message to a plurality of stations. Since the data message stored at the switching office includes the routing codes, the message can be broadcast to the outlets that are available while retaining in storage the routing codes of any unavailable stations. Thus, the multiple address circuit is enabled to reprocess the message as the stations become available. Line switching systems, however, establish connections to called subscribers prior to the initiation of the communication from the calling subscriber. The switching information is therefore not concurrently stored with the data message. In addition, facilities for repeated transmission of a message to multiple outlets are not provided.

Accordingly, it is an object of this invention to provide a multiple address circuit suitable for use with a line switching system.

Another object of this invention is to sequentially call subscriber stations in accordance with line switching information.

In accordance with the specific embodiment of the invention disclosed herein, the multiple address circuit is arranged to receive a data message from an originating station by way of a line switching network such as a PBX and distribute the message to a plurality of PBX stations in accordance with address digits transmitted by the originating station prior to the transmission of the data message.

It is a feature of this invention to receive a data message preceded by line switching information designating a plurality of addressee stations and concurrently store the data message and register line switching information.

It is another feature of this invention to send the registered digits of one addressee station and then the stored data message when the called subscriber answers the call. When the data message transmission is terminated, the registered digits of the next addressee station are transmitted, whereby the message is distributed to a plurality of stations.

It is a further feature to insert routing codes in the data message in accordance with the registered address digits to provide the routing information to the called subscriber.

Figure 19:
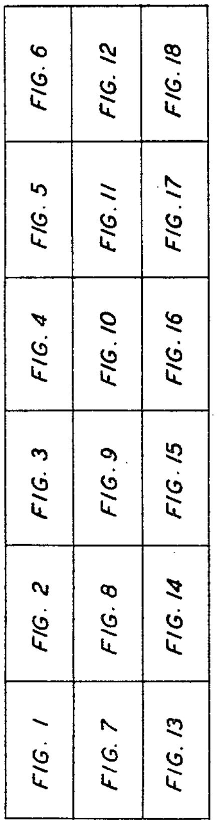
Figure 20:
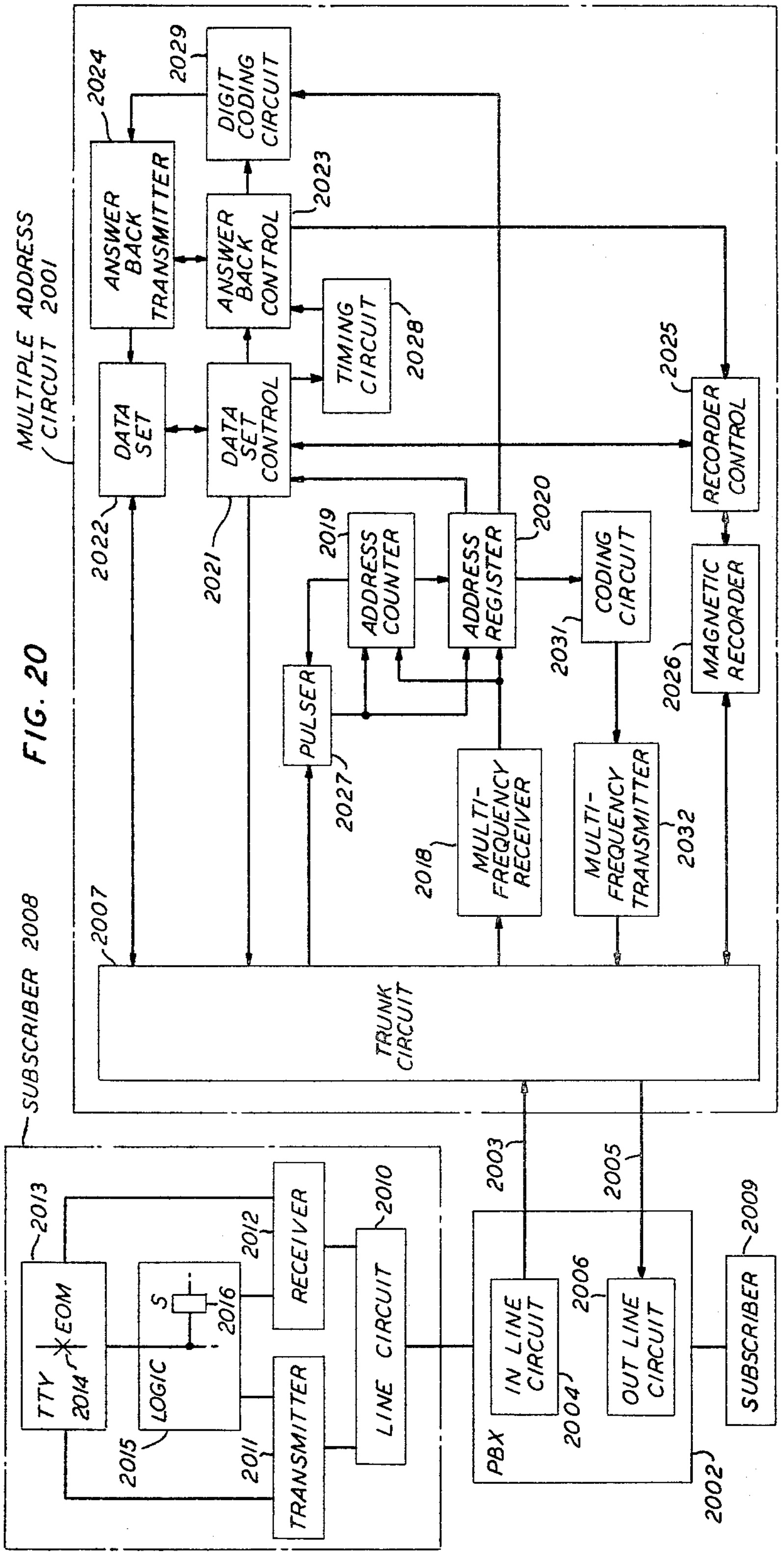

The foregoing and other objects and features of this invention will be fully understood from the following description of an illustrative embodiment thereof taken in conjunction with the accompanying drawing wherein:

FIGS. 1 through 18, when arranged as shown in FIG. 19, show the details of circuits and equipment which cooperate to form a multiple address circuit in accordance with the invention; and FIG. 20 illustrates, in block form, the various equipment and circuits of the multiple address circuit and the manner in which they cooperate with a PBX.

In the several figures of the drawing, the relay contacts are shown detached from the relay winding. Contacts which are closed when the associated relay is deenergized, known as "break contacts" are represented by a single short line perpendicular to the conductor line while contacts which are closed when the relay is energized, known as "make contacts," are represented by two short cross lines diagonally intersecting the conductor line. Eaih relay core is identified by a conventional core designation preceded by a number corresponding to the figure in the drawing wherein the core appears. Each set of relay contacts is identified by the relay core designation together with an individual contact number.

*General description*

Referring now to FIG. 20, a multiple address circuit is generally indicated by block 2001. Extending from multiple address circuit 2001 and, more specifically, from trunk circuit 2007 are outgoing channel 2005 and incoming channel 2003, which channels extend to outgoing line circuit 2006 and incoming line circuit 2004 in PBX

2002. PBX 2002, which may be of the type disclosed in the above-identified H. H. Abbott et al. patent and R. M. Green et al. application, also is connected to subscriber stations 2008 and 2009.

Subscriber station 2008 is capable of transmitting and receiving data messages and includes line circuit 2010, transmitter 2011, receiver 2012, teletypewriter 2013, and logic circuit 2015, arranged substantially in the same manner as the subscriber set disclosed in the above-identified T. L. Doktor et al. patent. In addition, logic circuit 2015 includes relay 2016 which corresponds to relay S in the T. L. Doktor et al. patent, which relay functions upon the operation thereof to send an end-of-message disconnect signal. In the present embodiment, the winding of relay 2016 is connected to end-of-message contact 2014 in teletypewriter 2013. Contact 2014, being arranged to operate when teletypewriter 2013 transmits or receives the end-of-message code sequence as is well known in the art, thereby preparing an energizing circuit for relay 2016. It is noted in the T. L. Doktor et al. patent that the subscriber data set includes in line circuit 2010 means for transmitting or dialing the digits of the desired called station. In accordance with the present embodiment, this dialing means may constitute any well known multifrequency dialing set which transmits a multifrequency tone for each digit.

Returning now to multiple address circuit 2001, trunk circuit 2007 is also connected to multifrequency receiver 2018, which receiver is capable of receiving the multifrequency digits, and multifrequency transmitter 2032 which transmitter is capable of sending the multifrequency digits. Multifrequency receiver 2018, in turn, is connected to address register 2020 and address counter 2019. Address register 2020 includes seven portions or sub-registers therein and has the capability of registering the digits of seven addresses. Address counter 2019 is a multistage counter having a stage corresponding to each of the sub-registers of address register 2020.

Trunk circuit 2007 is also connected to data set 2022, which data set is similar to the data set of subscriber 2008 with the exception that no teletypewriter is included therein. In addition, trunk circuit 2007 is connected to magnetic recorder 2026.

Assuming now that subscriber 2008 desires to transmit a data message to a plurality of other PBX subscribers, subscriber 2008 sends the address digits of multiple address circuit 2001. PBX 2002, in response thereto, rings trunk circuit 2007 and the trunk circuit trips the ringing and completes a D-C connection therethrough to subscriber 2008 by way of channel 2003 and incoming line circuit 2004 in the conventional manner. In addition, trunk circuit 2007 provides dial tone which is returned to subscriber 2008.

In response to the dial tone, subscriber 2008 proceeds to transmit the address digits of each of the addressee stations and at the termination thereof, the digit zero followed by the home address digits. These digits are applied by trunk circuit 2007 to multifrequency receiver 2018. Multifrequency receiver 2018, in response to each digit, advances address counter 2019 and applies the digit to address register 2020 which, under the control of address counter 2019, stores each address in sequential ones of the sub-registers. When the zero digit is received, the address counter is advanced to its last stage and the home address is thus stored in the last or seventh sub-register of address register 2020.

Upon the registration of the home address in address register 2020, data set control circuit 2021 is instructed to place data set 2022 in the answering mode, whereby, as described in detail in the above-identified T. L. Doktor et al. patent, data set 2022 transmits a connect signal. This connect signal is received by subscriber 2008 by way of trunk circuit 2007 enabling subscriber 2008 to initiate transmission. This is indicated by a return signal from subscriber 2008 to data set 2022, and data set control circuit 2021, in response thereto, instructs answer back control circuit 2023 to initiate an answer back sequence.

With answer back control circuit 2023 enabled, the operation of answer back transmitter 2024 is commenced. Answer back transmitter 2024 comprises a data transmitting device which sends data signals comprising the answer back sequence, which sequence is applied to data set 2022 and thus transmitted to subscriber 2008. In addition, answer back control circuit 2023 instructs recorder control circuit 2025 to initiate the operation of magnetic recorder 2026. Accordingly, magnetic recorder 2026 is prepared to record the data message when it is received from subscriber 2008.

At the termination of the answer back sequence, answer back transmitter 2024 sends a data signal instructing subscriber 2008 to begin transmitting the data message. Subscriber 2008, in response thereto, transmits the data message under control of teletypewriter 2013, which message is thus applied by trunk circuit 2007 to magnetic recorder 2026. At the end of the message the end-of-message signal is recognized by teletypewriter 2013 closing contact 2014 and the consequent energization of relay 2016 functions to transmit the disconnect signal. This disconnect signal is recognized by data set 2022 and data set control circuit 2021, in response thereto, instructs trunk circuit 2007 to disconnect. In addition, data set control circuit 2021 instructs recorder control circuit 2025 to restore magnetic recorder 2026 to its initial or home position.

When magnetic recorder 2026 restores, data set control circuit 2021 instructs trunk circuit 2007 to connect to outgoing line circuit 2006 by way of channel 2005 and request a register. In addition, data set control circuit 2021 transfers data set 2022 to the originating or calling mode.

When the register is attached by PBX 2002, trunk circuit 2007 operates pulser 2027 and pulse 2027, in turn, pulses address counter 2019 and address register 2020. Accordingly, address counter 2019 is advanced to its first stage nad address register 2020, under control of counter 2019 and pulser 2027, applies the digits of the first addressee station to coding circuit 2031. Coding circuit 2031, in turn, codes multifrequency transmitter 2032 with the digits of the first addressee and thus the digits are transmitted to the register by way of trunk circuit 2007. In addition, when address counter 2019 is advanced to enable address register 2020 to code coding circuit 2031 with the final digits, the operation of pulser 2027 is terminated.

PBX 2002, in response to the reception of the addressee digits, completes the connection to the address station and provides ringing thereto. As disclosed in the T. L. Doktor et al. patent, the called subscriber, in response thereto, returns the connect signal, which signal is thus received by data set 2022 and data set 2022, in turn, returns a signal to enable the called subscriber data set. In addition, data set control circuit 2021 applies an enabling signal to answer back control circuit 2023 by way of timing circuit 2028. This provides a delay operation to permit the called subscriber to transmit its answer back signals. Accordingly, after a predetermined delay, answer back control circuit 2023 initiates the operation of answer back transmitter 2024 to send the multiple address answer back code sequence. In addition, at this time, answer back control circuit 2023 enables digit coding circuit 2029, which is connected to address register 2020 codes answer back transmitter 2024 with code signals corresponding to the address digits of the called and calling subscribers. Accordingly, during the multiple address answer back sequence, these code signals are inserted therein and transmitted to the called subscriber by data set 2022 to identify the origin and the destination of the data message.

At the termination of the answer back code sequence, answer back control circuit 2023 instructs recorder control circuit 2025 to initiate the operation of magnetic recorder 2026. Accordingly, the data message recorded thereon is played back and transmitted by way of trunk circuit 2007 and channel 2005 to the called subscriber. In addition, during the play back of the message, recorder control circuit 2025 instructs data set control circuit 2021 to mute data set 2022 to eliminate any possible interference in the play back of the data message.

At the termination of the data message, the recorded end-of-message signal is transmitted and the called subscriber, in response thereto, returns the disconnect signal. This disconnect signal is received by data set 2022 and data set control circuit 2021, in response thereto, instructs trunk circuit 2007 to disconnect, and, in addition, instructs recorder control circuit 2025 to restore magnetic recorder 2026 to its initial position.

When magnetic recorder 2026 restores, trunk circuit 2007 again connects to outgoing line circuit 2006 and requests a register. When the register is attached, pulser 2027 is again enabled, address counter 2019 is advanced, and the digits of the second addressee are applied to coding circuit 2031 whereby multifrequency transmitter 2032 transmits the second addressee digits in the same manner as previously described. Accordingly, when the second addressee answers the call the connect signals are interchanged, the multiple address answer back sequence is transmitted, which sequence now includes the address codes of the second addressee, and the message is played back in the same manner as previously described. Similarly, each of the subsequent addressees are called and the answer back sequence and the data message are transmitted thereto.

After the conclusion of the transmission to the last addressee station, trunk circuit 2007 again requests a register and when the register is attached, pulser 2027 is operated to advance address counter 2019 to the last stage. This applies the digits of the home address to coding circuit 2031 whereby the calling subscriber is called. Accordingly, the answer back sequence and the message are transmitted to the home address in the same manner; the answer back sequence in this event, however, having only the home address code inserted therein. At the conclusion of the message, trunk circuit 2007 again disconnects. At this time, however, address register 2020 instructs data set control 2021 to disable data set 2022 and return trunk circuit 2007 to the initial idle condition. The multiple address circuit 2001 is thus restored to its initial idle condition where it is prepared to accept another multiple address message from a calling subscriber.

*Seizure of multiple address circuit*

Referring now to FIGS. 1 through 18 and, more specifically, to FIG. 1, a trunk circuit having a tip lead T, a ring lead R and sleeve lead S is disclosed therein. Leads T, R and S extend to an incoming line circuit which terminates on the line link frame of a PBX of the type disclosed in the above-identified Patent 2,949,506 issued to H. H. Abbott et al. and in the above-identified copending application of R. M. Green et al. When the multiple address circuit is called by the originating station by dialing a selected three digit number, the originating subscriber line circuit is connected to the trunk circuit and a ringing signal is applied to ring lead R. This applied ringing signal is then coupled through break contact 17–RCP–1, the break contact of contacts 1–OG–1, the lower primary winding of repeat coil RCA, as shown in FIG. 1, capacitor CP1, the upper primary winding of repeat coil RCA, the winding of relay 1–RU and the break contact of contacts 1–OG–2, to tip lead T. This results in the operation of relay 1–RU which completes an operating path for relay 1–ANS by way of make contact 1–RU–1.

The operation of relay 1–ANS completes a shunting path around the winding of relay 1–RU by way of make contact 1–ANS–1, releasing relay 1–RU. In addition, relay 1–ANS operated completes a path around capacitor CP1 by way of make contact 1–ANS–2, the lower winding of relay 1–A as shown in FIG. 1, break contact 8–EM–1, the break contact of contacts 8–ORD–1 and the upper winding of relay 1–A. The completion of this D-C path trips the PBX ringing circuit in the conventional manner and energizes relay 1–A. In addition, relay 1–ANS operated completes the operating path for relay 8–ON, FIG. 8, by way of diode DD1 and the make contact of contacts 1–ANS–4.

With relay 8–ON operated, ground is applied to sleeve lead S by way of make contact 8–ON–2 to indicate the busy condition of the multiple address trunk. Relay 8–ON operated also extends the output of dial tone supply 101 through repeat coil RCB, capacitor CP2, make contact 8–ON–1 and break contact 4–BSA–1 to the multiple address tone circuit whereby dial tone is returned to the calling subscriber. Relay 8–ON operated also extends operating battery to relay 2–GCC and to multifrequency receiver 201.

Multifrequency receiver 201 functions to convert received multifrequency tones representing digits to a first ground signal applied to one of output conductors L1 to L4 and a second ground signal applied to output conductors H1 through H3. A multifrequency receiver suitable for use in this system is disclosed in Patent 2,237,742 issued to A. A. Lundstrom on Apr. 8, 1941.

The operation of relay 8–ON also completes the operating path of relay 9–STM by way of break contact 9–EA–1, break contact 17–ALM–6, break contact 8–EM–2 and make contact 8–ON–4. Relay 9–STM operated, in turn, completes an obvious path for energizing motor 301 from source 308, motor 301 comprising the driving motor for the answer back machine, generally indicated by block 302, which machine is described in further detail hereinafter.

Figure 17:
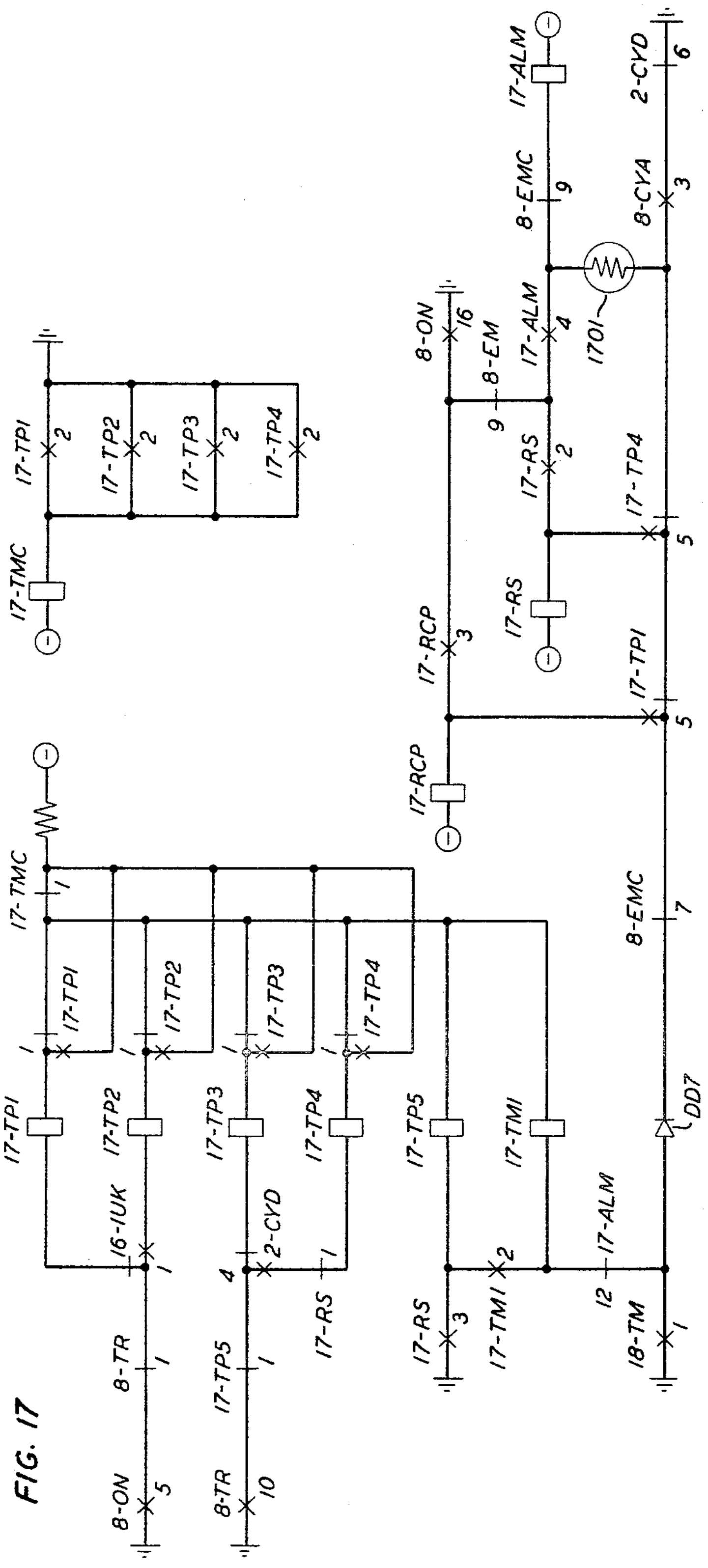

With relay 8–ON operated, a first timing relay in the timing circuit shown in FIG. 17 is operated to time the interval between the subscriber's connection to the multiple address circuit and the reception from the subscriber of the digit addresses of the several addressee stations. This operating path is traced from ground from make contact 8–ON–5, break contact 8–TR–1, the break contact of contacts 16–1UK–1, the winding of relay 17–TP1, the break contact of contacts 17–TP1–1 and break contact 17–TMC–1, operating relay 17–TP1 which locks through its own make contacts. With relay 17–TP1 operated, an obvious operating path for relay 17–TMC is now completed. The functions of relays 17–TP1 and 17–TMC will be described in detail hereinafter.

Figure 4:
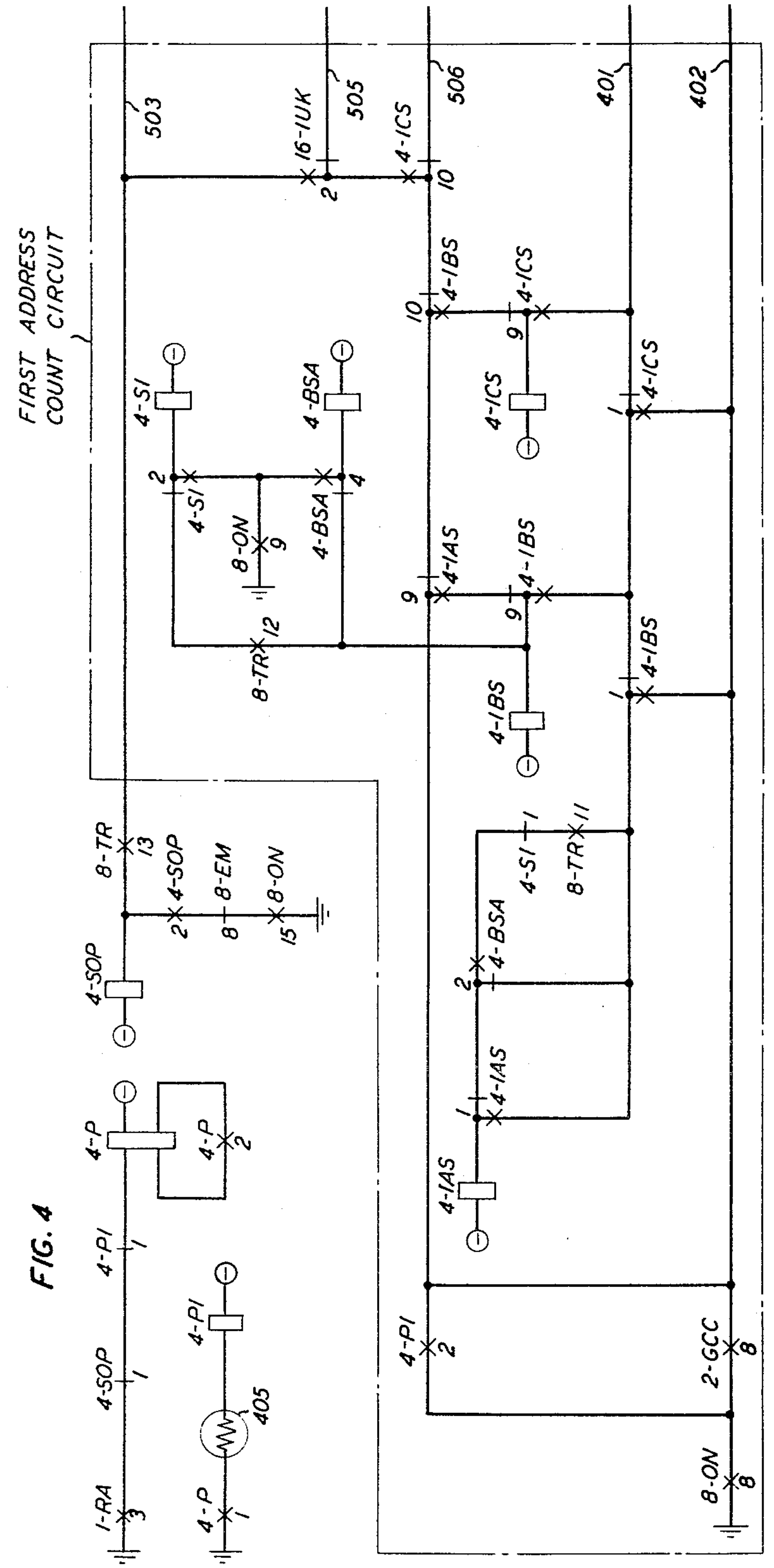
Figure 5:
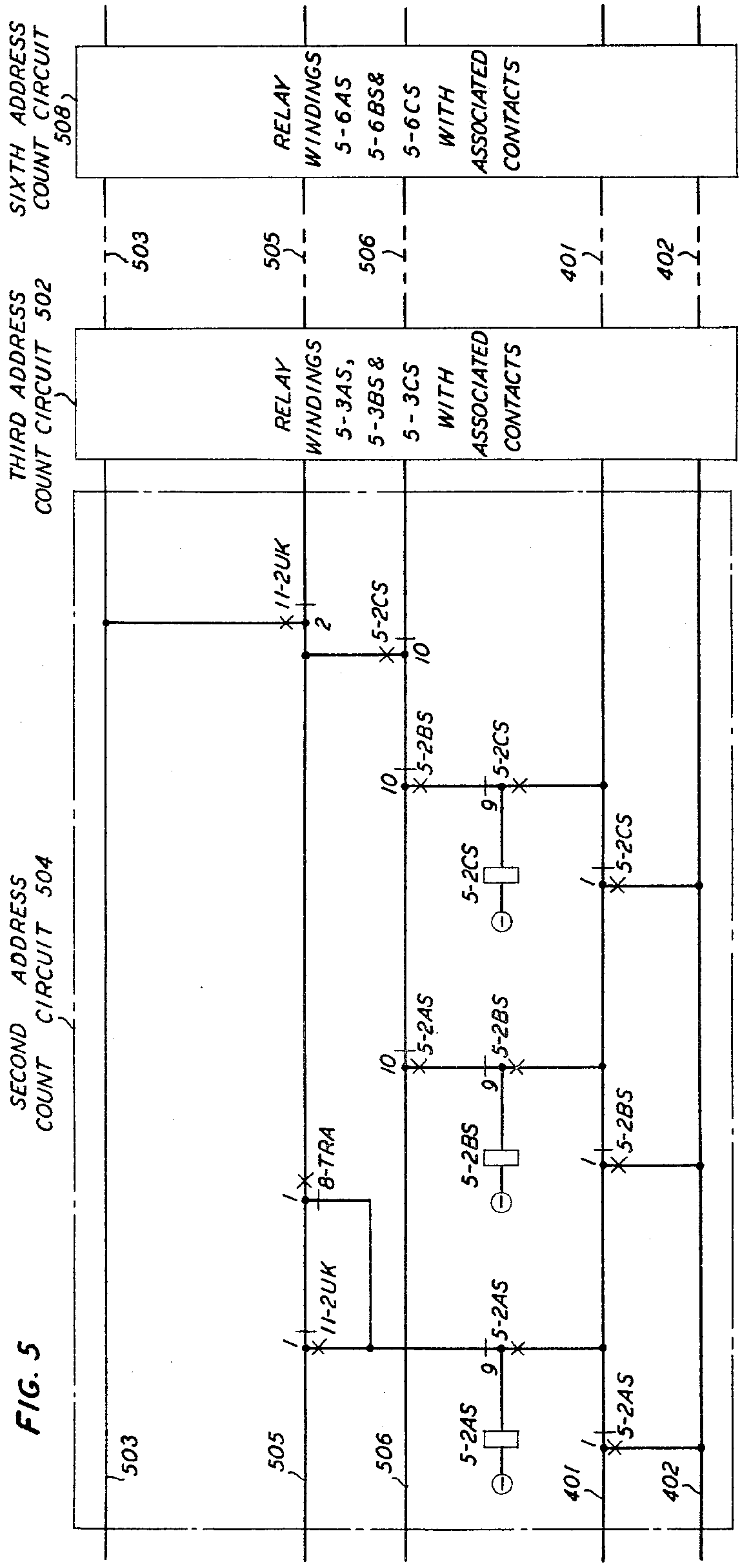
Figure 6:
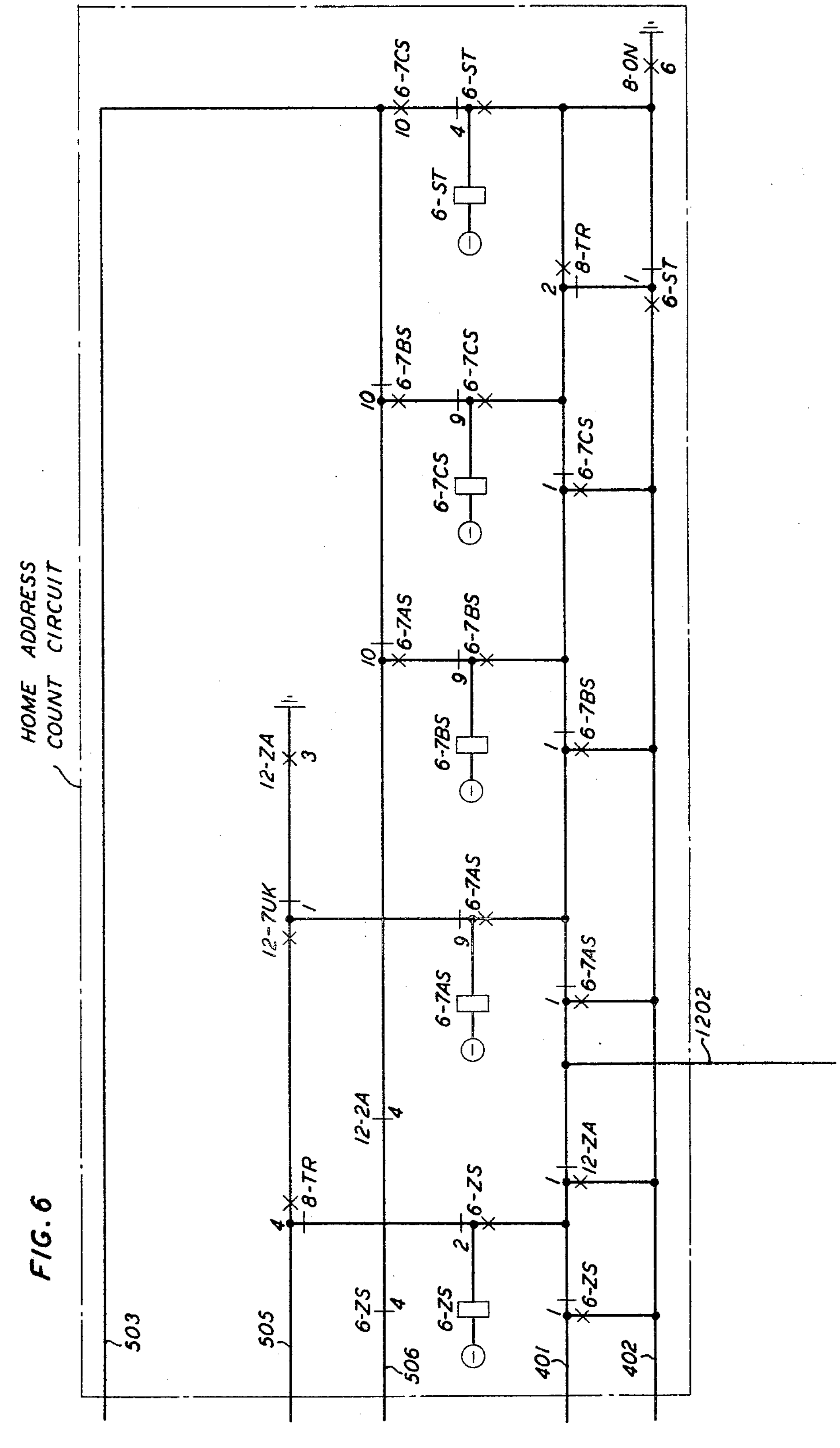

The operation of relay 8–ON also completes an operating path for counting relay 4–1AS, in the first address count circuit shown in FIG. 4, which path is traced from the winding of relay 4–1AS through the break contact of contacts 4–1AS–1, the break contact of contacts 4–BSA–2, the break contact of contacts 4–1BS–1, the break contact of contacts 4–1CS–1, lead 401, to FIG. 5 and then through the break contacts of contacts 5–2AS–1, 5–2BS–1 and 5–2CS–1 in the second address count circuit generally indicated by block 501 and then by way of lead 401 to corresponding contacts of relays 5–3AS, 5–3BS and 5–3CS, which relays and relay contacts are not shown but are generally indicated by third address count circuit 502 and then further by way of corresponding contacts of intermediate address count circuit relays including relays 5–6AS, 5–6BS and 5–6CS, which latter relays are generally indicated by sixth address count circuit 508 and thence by lead 401 to FIG. 6 and through the break contacts of contacts 6–ZS–1, 12–ZA–1, 6–7AS–1, 6–7BS–1, 6–7CS–1, 8–TR–2 and 6–ST–1 and make contact 8–ON–6 to ground. The consequent operation of relay 4–1AS provides a locking path by way of the make contact of contacts 4–1AS–1 shunting the contacts of relay 4–BSA in the previously described operating path of relay 4–1AS.

*Registering the called stations digits*

In response to the reception of the dial tone, the calling subscriber proceeds to transmit the multifrequency digits designating the called subscriber. These tones are received by the multiple address trunk circuit and applied to the lower secondary winding of repeater coil RCA, as shown in FIG. 1, and thence by way of the break contacts of relay 6–ST and leads T1 and R1 to the input of multifrequency receiver 201.

The reception of the first multifrequency digit extends ground to a selected one of leads L1 to L4, to a selected one of leads H1 through H3 and to the winding of relay 2–GCC as described in the above-identified Lundstrom patent. With relay 2–GCC operated, leads L1 through L4 and H1 through H3 are extended by way of cable mutiple 202 through make contacts 1 through 7 of relay 2–GCC shown in multiple in FIG. 2 and thence, further following cable 202, through FIGS. 8 and 9 to FIG. 10 wherein lead L4 reappears together with leads L1 through L3 and H1 through H3, which latter leads are shown in multiple form. With relay 4–1AS operated, lead L4 is then extended by way of the make contact of contacts 4–1AS–8 to lead 1003, lead 1003, in turn, extending to FIG. 12 and then through break contact 8–TR–3 to the winding of relay 12–ZA. Accordingly, in the event that the initial digit is zero, ground is applied to conductor L4 and relay 12–ZA operates. This indicates that only the calling subscriber's home address is to follow. The function of relay 12–ZA will be described hereinafter.

If the first digit is not zero, ground is not applied to conductor L4 and a selected one of conductors L1 through L3 together with a selected one of conductors H1 through H3 has ground applied thereto, as previously described. Following conductors L1 through L3 and H1 through H3 in FIG. 10, it is seen that these conductors extend through make contacts 2 through 7 of contact 4–1AS, which contacts are shown in multiple in FIG. 10. Conductors L1 through L3 and H1 through H3 then extend to the first address register, generally indicated by block 1009 shown in FIGS. 10 and 16. Individual leads L1 through L3 and H1 through H3 then reappear in block 1009 and extend to the windings of relays 10–1A through 10–1C and 10–1D through 10–1F, respectively. It is noted that block 1009 generally includes the energizing circuits of register relays 10–1A through 10–1V, FIG. 10, and the energizing circuit of relay 16–1UK shown in FIG. 16. Accordingly, a corresponding one of relays 10–1A through 10–1C and 10–1D through 10–1F is operated.

Figure 16:
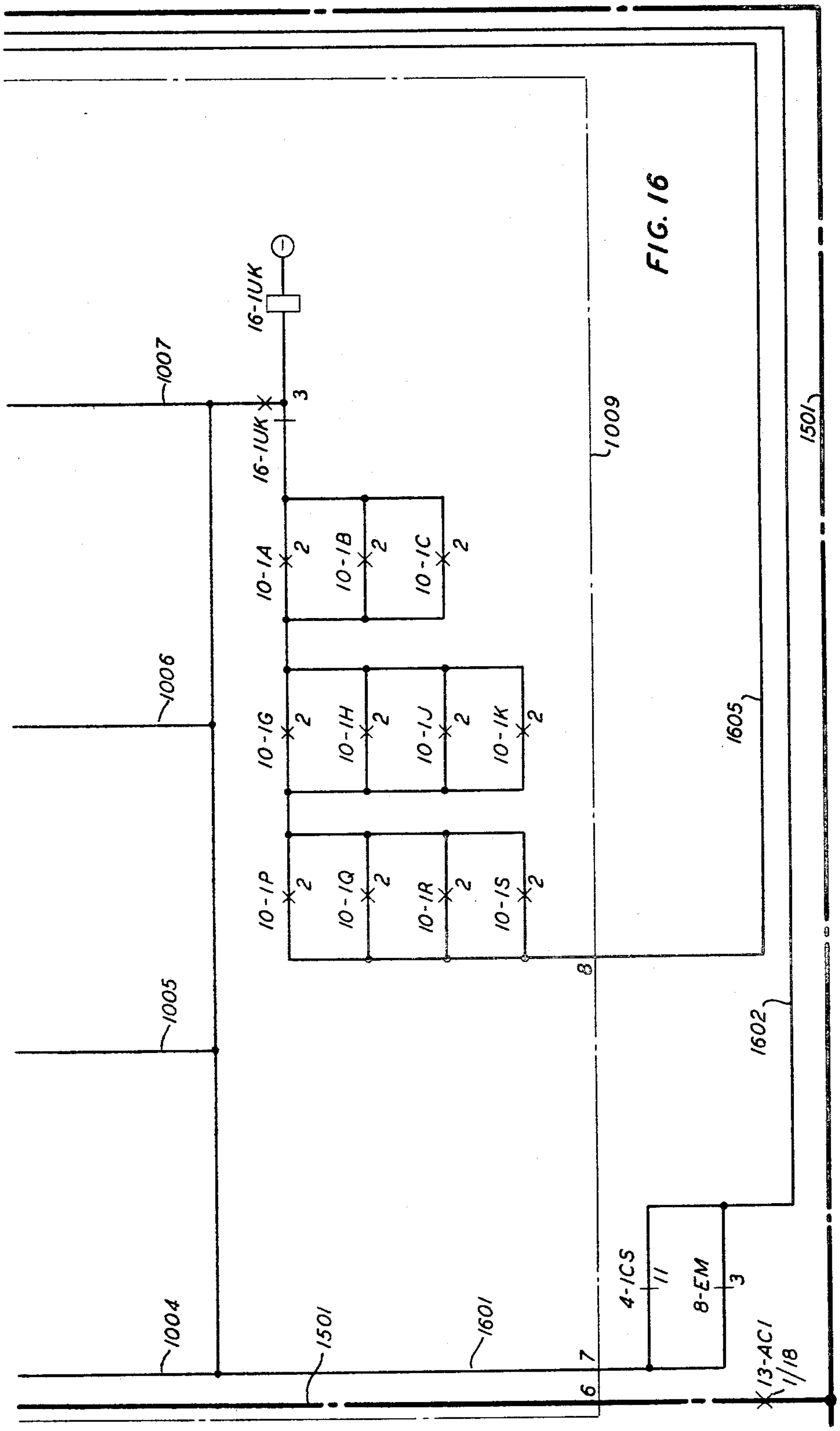

The operated ones of relays 10–1A through 10–1E complete locking paths through their own make contact and lead 1004 to lead 1601, FIG. 16. Correspondingly, if relay 10–1F is operated, a self-locking path is completed through its own make contact and lead 1005 to lead 1601. Lead 1601, in turn, extends to ground by way of break contact 8–EM–3 or 4–1CS–11 in shunt thereto, conductor 1602 which extends to FIG. 12 and then by way of make contact 8–ON–7 to ground. It is thus seen that selected ones of relays 10–1A through 10–1F are operated and locked in accordance with the first digit of the first addressee station.

During the reception of the first digit, relay 2–GCC is operated, as previously described. This completes the operating path of relay 4–1BS, which path may be traced from the winding of the relay through the break contact of contacts 4–1BS–9, the make contact of contacts 4–1AS–9 to lead 402 and then by way of make contact 2–GCC–8 and make contact 8–ON–8 to ground, operating relay 4–1BS which locks by way of its own make contact and the break contact of contacts 4–1CS–1 to lead 401, lead 401, in turn, extending to ground, as previously described. With relay 4–1BS operated, the previously-described locking path of relay 4–1AS is transferred to lead 402 by way of the make contact of contacts 4–1BS–1. In addition, the ground extended to the winding of relay 4–1BS is also applied by way of the break contact of contacts 4–BSA–4 to the winding of relay 4–BSA which locks by way of its own make contact and make contact 8–ON–9. With relay 4–BSA operated, the path supplying dial tone to the calling subscriber is opened.

At the termination of the reception of the first multifrequency digit, multifrequency receiver 201 opens the energizing path of relay 2–GCC and the consequent release of the relay removes ground from lead 402. Removal of ground from lead 402 terminates the application of the holding ground to relay 4–1AS and this relay releases.

Figure 3:
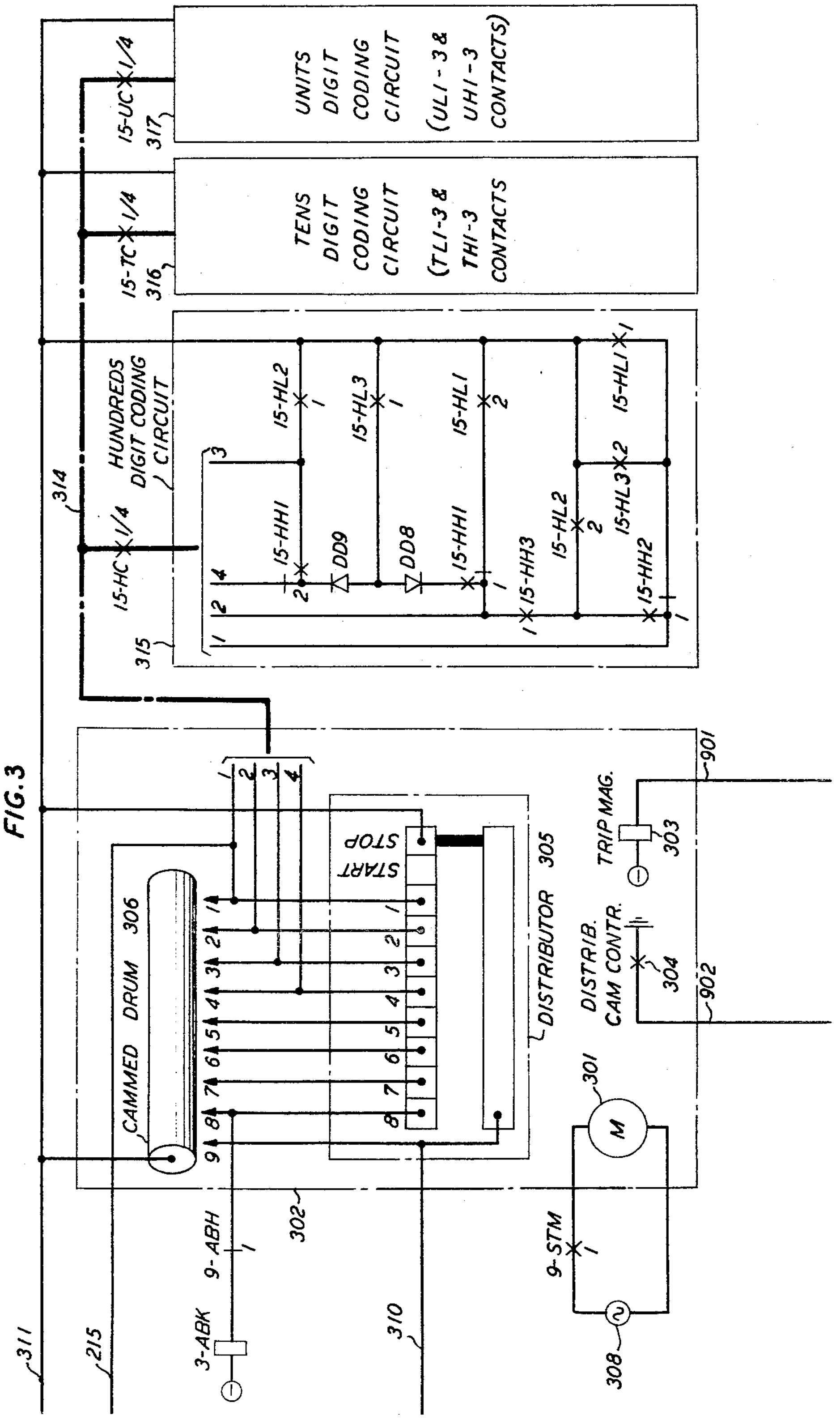

Recalling now that the operation of relay 9–STM energizes motor 301 of answer back mechanism 302, shown in FIG. 3, answer back mechanism 302 also includes distributor 305, cammed drum 306, trip magnet 303 and distributor cam contacts 304. Answer back mechanism 302 also includes a motor drive shaft, not shown, which is connected to both distributor 305 and drum 306 and linkages, not shown, which permit the rotation of distributor 305 upon the energization of trip magnet 303, and at the completion of each rotation of distributor 305, the stepping of drum 306. It is noted that associated with drum 306 are nine sensing contacts, contacts 1 through 8 thereof extending to distributor segments 1 through 8 and contact 9 extending to the common segment of distributor 305 and to common terminal conductor 310. As seen in FIG. 3, the stop segment of distributor 305 is connected to an output conductor 311, which output conductor also extends to drum 306.

Drum 306 is provided with cammed surfaces whereby in any one selected position of drum 306 selected ones of its contacts 1 through 7 make an electrical connection to output conductor 311. In addition, cammed drum 306 is arranged to effect an electrical connection between output conductor 311 and contact 8 during every step of the rotation of the drum except when the drum is at the initial, or home position. Conversely, suppressor contact 9 is electrically connected to output conductor 311 only when drum 306 is at the home position. An answer back drum mechanism which provides a distributor, a cammed drum and appropriate linkages in the manner described above is available in the Model 33 Page Printer Set, a product of the Teletype Corporation, which set is described in Bulletin 273B, Technical Manual, Model 32 and 33 and copyrighted in the United States by the Teletype Corporation in 1962 and 1963.

Figure 2:
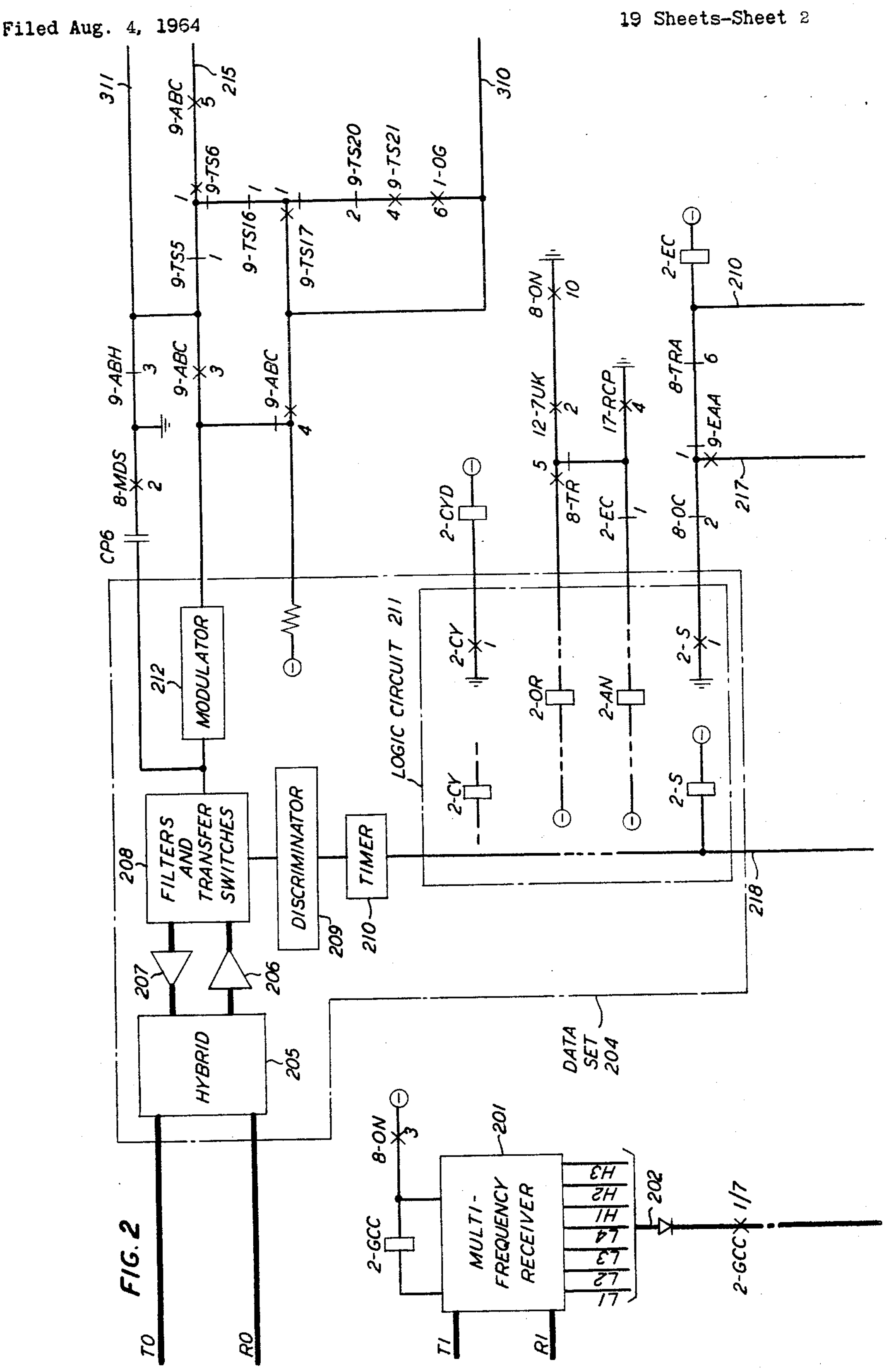

Recalling now that contact 8 of drum 306 is electrically connected to conductor 311 during every step of drum 306 with the exception of the home position, in the event that drum 306 is in the off-normal position an energizing circuit for relay 3–ABK is completed by way of break contact 9–ABH–1, contact 8 of drum 306, conductor 311 and break contact 9–ABH–3, FIG. 2.

Figure 9:
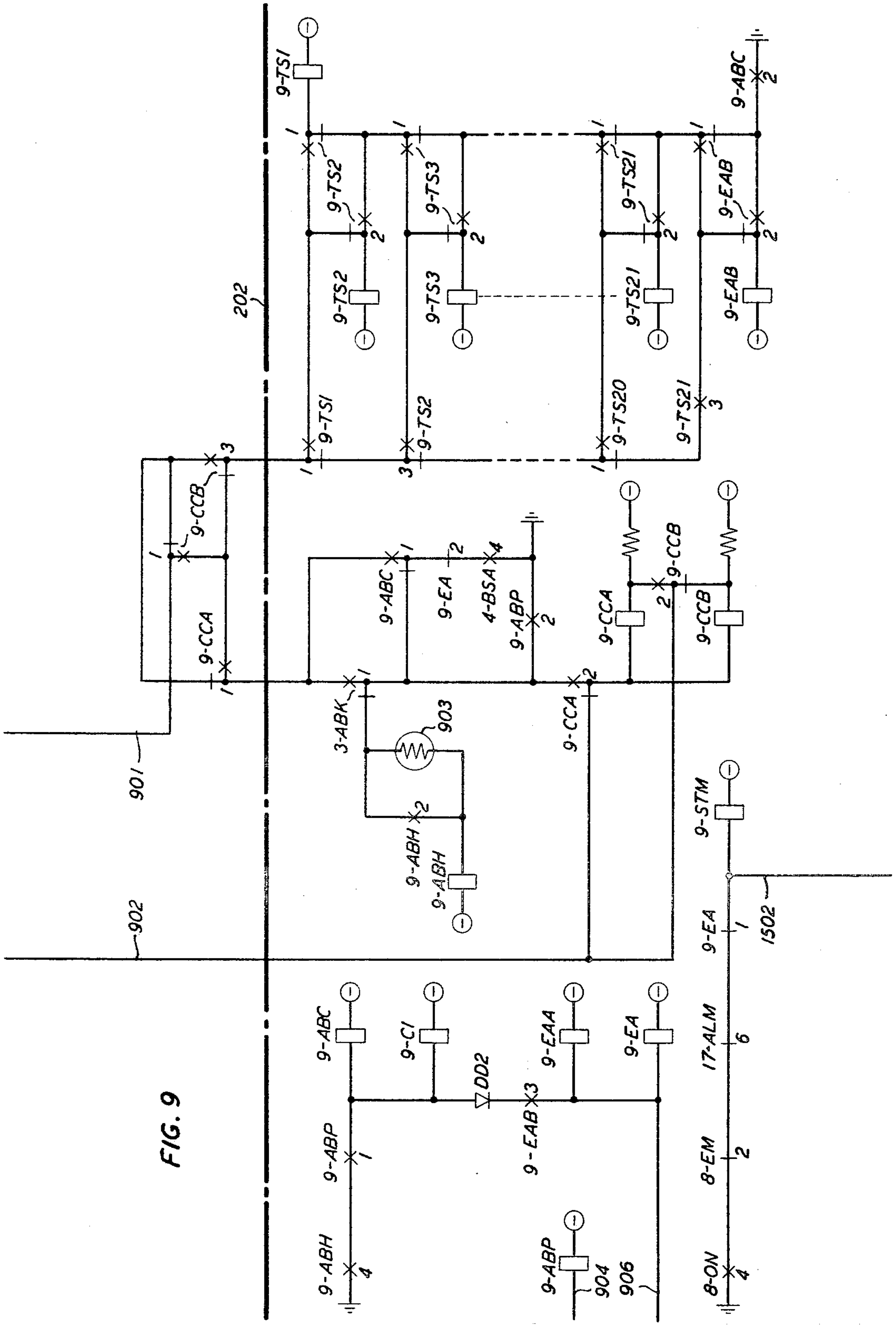

With relay 3–ABK operated, an energizing path for trip magnet 303 is completed by way of lead 901, the break contact of contacts 9–CCB–1, FIG. 9, the break contact of contacts 9–CCA–1, the make contact of contacts 3–ABK–1, the break contact of contacts 9–ABC–1, break contact 9–EA–2 and make contact 4–BSA–4, which latter relay was previously operated as described above. With the energization of trip magnet 303, distributor 305 proceeds to rotate, the wipers succesively contacting the start segment, segments 1 through 8, and the stop segment.

Near the conclusion of the distributor rotation, distributor cam contacts 304 momentarily close and drum 306 is advanced one step. Upon the closure of contacts 304, ground is applied therethrough to conductor 902 and conductor 902, in turn, extends to FIG. 9 and then by way of the break contact of contacts 9–CCA–2 to the windings of relays 9–CCA and 9–CCB. Relay 9–CCB, at this time, has shunting ground applied through the break contact of contacts 9–CCB–2 whereby only relay 9–CCA operates and locks through the make contact of contacts 9–CCA–2, the break contact of contacts 9–ABC–1, break contact 9–EA–2 and make contact 4–BSA–4. The operation of relay 9–CCA opens the previously-described energizing path for trip magnet 303.

The subsequent reopening of contact 304 removes the shunt-down ground applied to relay 9–CCB, and relay 9–CCB operates in parallel with relay 9–CCA. With relay 9–CCB operated, an energizing path is recompleted for trip magnet 303 by way of lead 901, the make contact of contacts 9–CCB–1, the make contact of contacts 9–CCA–1 and the previously-described contacts of relays 3–ABK, 9–ABC, 9–EA and 4–BSA. With trip magnet 303 re-energized, distributor 305 is again released for another revolution, contacts 304 momentarily closing and cammed drum 306 stepping near the end of the revolution.

When cam contacts 304 close, ground is reapplied to conductor 902 which now extends by way of the make contact of contacts 9–CCB–2 to apply shunt-down ground to relay 9–CCA. Accordingly, relay 9–CCA is released, opening the energizing path of trip magnet 303. In addition, with relay 9–CCA released, the locking ground for relays 9–CCA and 9–CCB is removed and conductor 902 is re-extended by way of the break contact of contacts 9–CCA–2 to the windings of relays 9–CCA and 9–CCB. Accordingly, when cam contact 304 reopens, removing the ground from lead 902, relay 9–CCB releases.

With relays 9–CCA and 9–CCB released, trip magnet 303 is re-energized, as previously described. Distributor 305 is thus again released for rotation, and cammed drum 306 continues to step until it returns to the home position. At the home position, contact 8 of drum 306 no longer is connected to conductor 311 and relay 3–ABK releases. The release of relay 3–ABK opens the previously-described energizing path for trip magnet 303, terminating the cycling of distributor 305 and the stepping of drum 306. Accordingly, it is seen that on the initial reception of the address digits by the multiple address circuit as indicated by the operation of relay 4–BSA, drum 306 is stepped around until it reaches its home position. At this position, relay 3–ABK releases operating relay 9–ABH via the break contact of contacts 3–ABK and relay 9–ABH maintains relay 3–ABK released.

Returning now to the reception of the multi-frequency digits from the calling subscriber, the reception of the second digit reoperates relay 2–GCC as previously described. With relay 2–GCC operated, ground is reapplied through make contacts 8–ON–8 and 2–GCC–8, FIG. 4, and thence by way of the break contact of contacts 4–1AS–9, the make contact of contacts 4–1BS–10 and the break contact of contacts 4–1CS–9 to the winding of relay 4–1CS which locks by way of its own make contact to lead 401 which has ground applied thereto, as previously described. With relay 4–1CS operated, the holding path for relay 4–1BS is transferred through the make contact of contacts 4–1CS–1 to lead 402.

Figure 10:
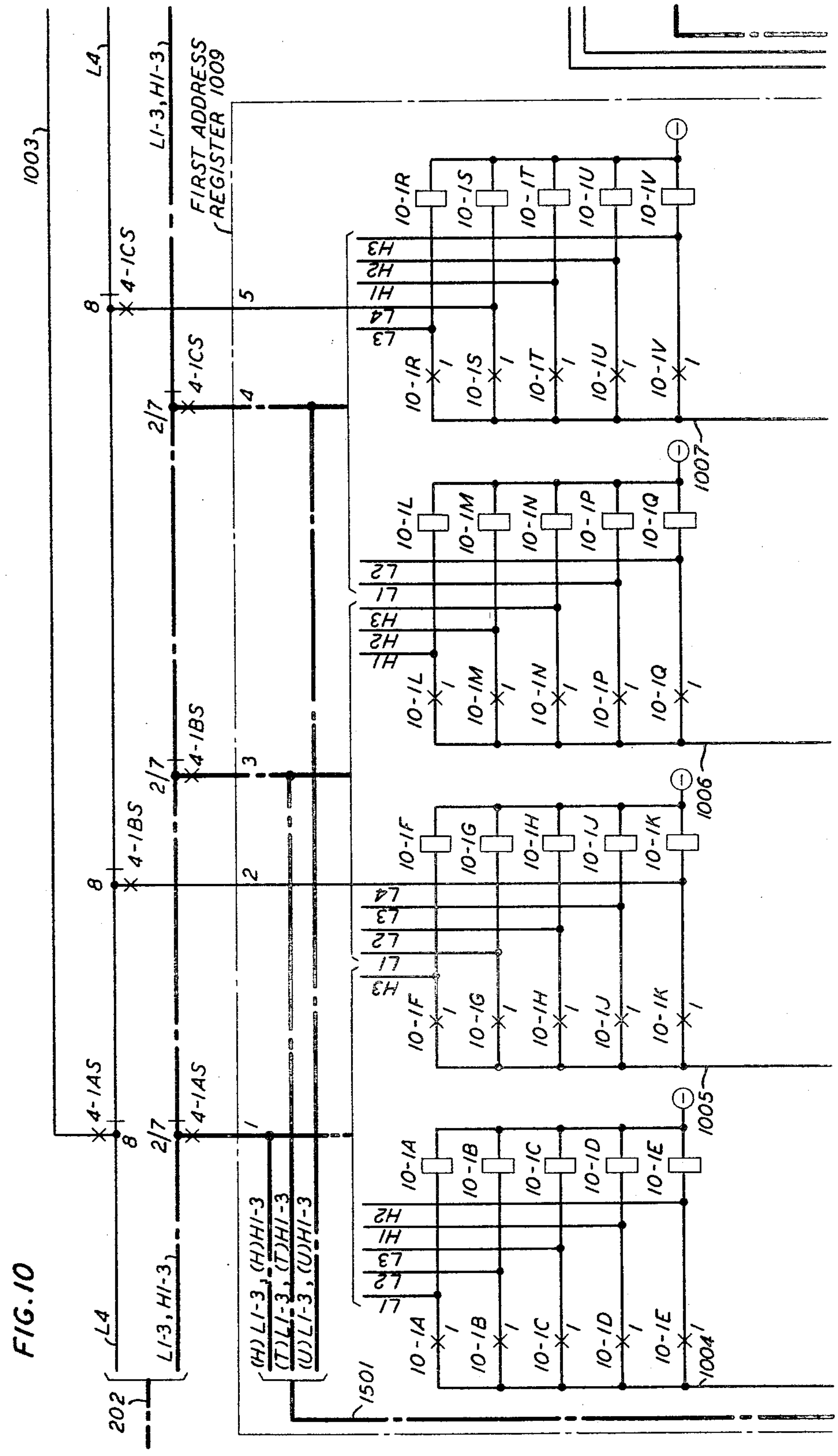

Meanwhile, ground is applied to the selected ones of leads L1 through L4 and H1 through H3 in response to the reception of the second digit by multifrequency receiver 201 which leads extend through cable 202 where they reappear in FIG. 10 as previously described. With relay 4–1BS operated, and relay 4–1AS released, conductor L4 extends through the make contact of contacts 4–1BS–8 to the winding of relay 10–1K and conductors L1 through L3 and H1 through H3 extend in multiple through make contacts 2 through 7 of relay 4–1BS shown in multiple to register 1009 wherein they reappear and extend to the windings of relays 10–1G through 10–1J and 10–1L through 10–1N, respectively. Accordingly, selected ones of relays 10–1G through 10–1N operate and lock through their own make contacts and leads 1005 or 1006 to lead 1601 thus storing the designations of the second digit. The subsequent release of relay 2–GCC then opens the holding path of relay 4–1BS and the latter relay releases.

Upon the reception of the third digit, relay 2–GCC reoperates and with relay 4–1BS released and relay 4–1CS operated the ground through make contact 2–GCC–8 is applied by way of the break contact of contacts 4–1BS–10, the make contact of contacts 4–1CS–10, the break contact of contacts 16–1UK–2 and lead 505 to second address count circuit 501. Therein lead 505 extends through the break contact of contacts 11–2UK–1, FIG. 5, the break contact of contacts 8–TRA–1 and the break contact of contacts 5–2AS–9 to the winding of relay 5–2AS, operating the latter relay which locks through its own make contact to lead 401. With relay 5–2AS operated, the holding path for relay 4–1CS is transferred to lead 402 by way of the make contact of contacts 5–2AS–1.

With relay 4–1BS released, and relay 4–1CS operated, lead L4 extends through the make contact of contacts 4–1CS–8 to the winding of relay 10–1S and leads L1 through L3 and H1 through H3 extend through make contacts 2 through 7 of relay 4–1CS to register 1009 wherein they reappear and extend to the windings of relays 10–1P through 10–1R and 10–1T through 10–1V, respectively. Accordingly, selected ones of relays 10–1P through 10–1V operate in accordance with ground applied to the leads extending thereto by multifrequency receiver 201 in response to the reception of the third digit and the operated ones of the storage relays lock through their own make contacts and conductors 1006 and 1007 to lead 1601, thus storing the third digit. The subsequent release of relay 2–GCC at the termination of the reception of the third digit opens the previously-described holding path for relay 4–1CS and the latter relay releases.

When the first digit of the second address is received from the calling subscribed, relay 2–GCC reoperates, as previously described, and with relay 4–1CS released, the ground applied through make contact 2–GCC–8 is passed through the break contact of contacts 4–1CS–10 to lead 506. Lead 506, in turn, extends to the second address count circuit 501 and therein by way of the make contact of contacts 5–2AS–10, and the break contact of contacts 5–2BS–9 to the winding of relay 5–2BS which operates and locks to lead 401 by way of its own make contact. With relay 5–2BS operated the holding path for relay 5–2AS is transferred to lead 402 by way of the make contact of contacts 5–2BS–1.

Figure 11:
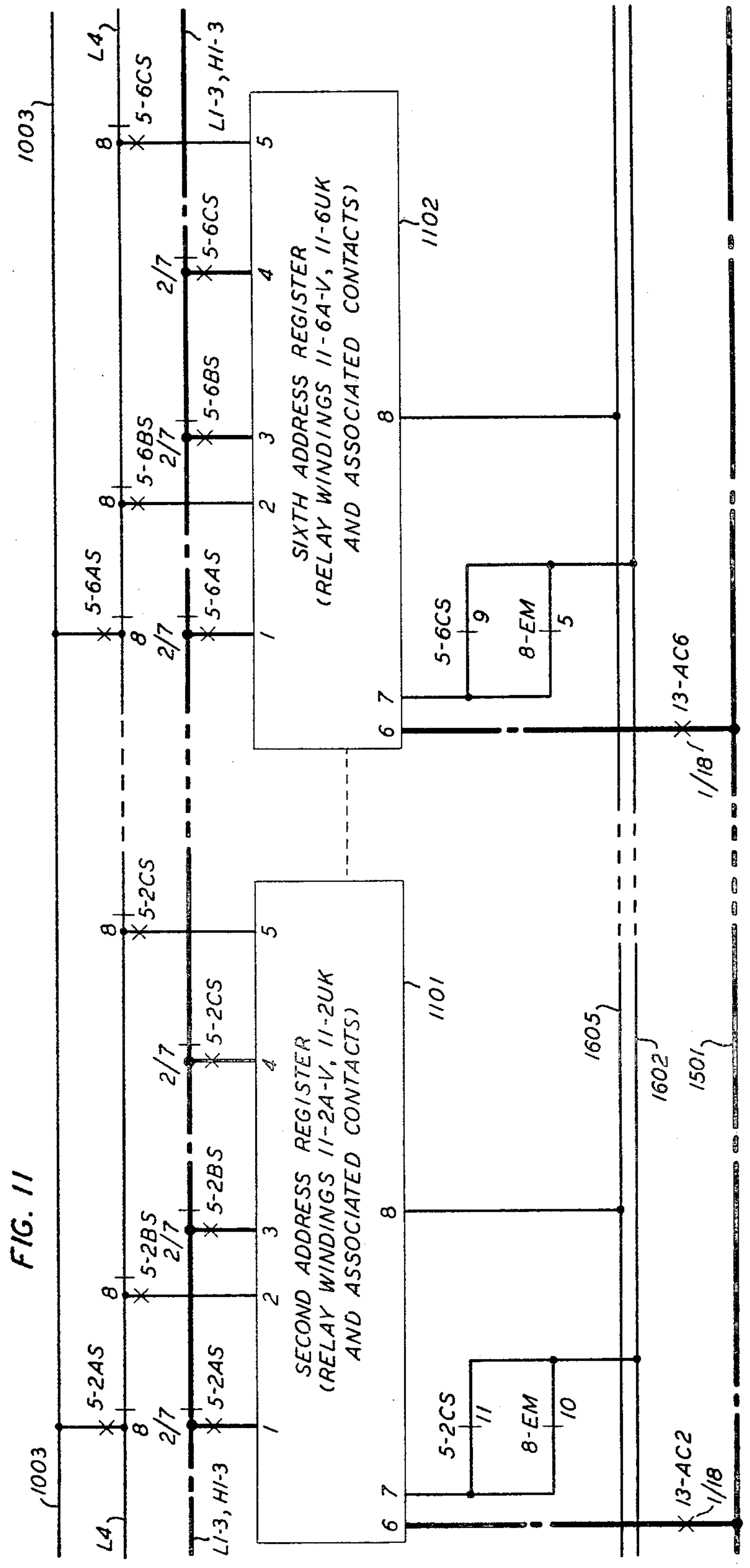

Since relay 5–2AS is operated, lead L4 extends through FIG. 10 to FIG. 11 and then by way of the make contact of contacts 5–2AS–8 to lead 1003. Lead 1003, in turn, extends to the winding of relay 12–ZA, as previously described. Accordingly, in the event that the second address is preceded by the digit zero indicating that the home address is to follow, and ground thereby applied to lead L4, relay 12–ZA is operated. The functions of relay 12–ZA will be described hereinafter.

In the event that the first digit of the second address is not zero, selected ones of relays 11–2A through 11–2F, not shown, but included in the second address register 1101, will be operated since conductors L1 through L3 and H1 through H3 extend thereto by way of make contacts 2 through 7 of relay 5–2AS. Second address register 1101 is arranged in substantially the same manner as the first address register 1009 with the exception that the relays corresponding to relays 10–1A through 10–1V are designated 11–2A through 11–2V and the relay corresponding to relay 16–1UK is designated relay 11–2UK. Accordingly, the selected ones of relays 11–2A through 11–2F are operated and locked through their own make contacts and then through break contact 8–EM–10 or 5–2CS–11 to lead 1602, thereby storing the first digit of the second address. At the termination of the reception of the first digit, relay 2–GCC releases, releasing, in turn, relay 5–2AS.

When the second digit of the second address is received, the operation of relay 2–GCC reapplies ground to lead 506 and with relay 5–2BS operated, lead 506 extends by way of the make contact of contacts 5–2BS–10 and the break contact of contacts 5–2CS–9 to the winding of relay 5–2CS. Relay 5–2CS operated locks by way of its own make contact to lead 401 and transfers the holding path of relay 5–2BS to lead 402 by way of the make contact of contacts 5–2CS–1.

With relay 5–2BS operated, lead L4, as seen in FIG. 11, is extended through the break contact of contacts 5–2AS–8 and the make contact of contacts 5–2BS–8 to the second address register 1101, and therein extending to the winding of relay 11–2K which corresponds to relay 10–1K in the first address register 1009. In addition, conductors L1 through L3 and H1 through H3, as seen in FIG. 11, extend through break contacts 2 through 7 of relay 5–2AS and through make contacts 2 through 7 of relay 5–2BS to the second address register 1101, and therein extending to address register relays 11–2G through 11–2J and 11–2L through 11–2N. Accordingly, the selected ones of relays 11–2G through 11–2N operate and lock to lead 1602, thereby registering the second digit of the second address. The subsequent release of relay 2–GCC then releases relay 5–2BS.

Upon the reception of the third digit, relay 2–GCC reoperates and ground is thus applied through the make contact of contacts 5–2CS–10 and the break contact of contacts 11–2UK–2 to lead 505 which extends to the third address count circuit generally indicated by block 502. Count circuit 502 is arranged in substantially the same manner as count circuit 501 with the exception that the relays corresponding to relays 5–2AS, 5–2BS and 5–2CS are designated 5–3AS, 5–3BS and 5–3CS and the contacts corresponding to relay 11–2UK contacts are associated with relay 11–3UK. Accordingly, the application of ground to lead 505 operates the relay corresponding to relay 5–2AS, which relay is designated relay 5–3AS. Similarly, the operation of relay 5–3AS provides a self-locking path to lead 401, and transfers the holding path of relay 5–2CS to lead 402. Since relay 5–2CS is operated, lead L4 extends to address register 1101 and leads L1 through L3 and H1 through H3 extend to register 1101 by way of the make contact of contacts 5–2CS–8 and make contacts 2 through 7 of relay 5–2CS, respectively. Accordingly, the third digit of the second address is registered in second address register 1101. The subsequent release of relay 2–GCC then releases relay 5–2CS.

In a corresponding manner, count circuit 502 counts the digits of the third address, which digits are registered in a third address register, not shown, a fourth count circuit, not shown, counts the digits of the fourth address and a fourth address register, not shown, stores the digits, and a fifth count circuit, not shown, counts the digits of the fifth address and a fifth register stores the fifth address digits. It is to be recalled, however, that in the event an address is preceded by the digit zero, relay 12–ZA is operated and, as described hereinafter, the subsequent digits are not stored in the corresponding address register.

The sixth address digits are counted by the sixth address count circuit, generally indicated by block 508, which count circuit includes relays 5–6AS, 5–6BS and 5–6CS. With relay 5–6AS operated, leads L1 through L3 and H1 through H3 extend to the sixth address register, generally indicated by block 1102, by way of make contacts 2 through 7 of relay 5–6AS. Conversely, if the sixth address is preceded by the digit zero, the consequent ground on lead L4 is passed by way of the make contact of contacts 5–6AS–8 to lead 1003 and thence to the winding of relay 12–ZA.

Assuming that the sixth address is not preceded by the digit zero, the first digit is stored in adress register 1102, the operated address register relays locking to lead 1602 by way of break contact 8–EM–5 or 5–6CS–9 in shunt thereto.

Similarly, during the reception of the second digit, lead L4 extends to regiser 1102 and leads L1 through L3 and H1 through H3 extend to register 1102 by way of the make contact of contacts 5–6BS–8 and make contacts 2 through 7 of relay 5–6BS to store the second digit in register 1102. In the same manner, lead L4 extends to register 1102 and leads L1 through L3 and H1 through H3 extend to register 1102 by way of make contact of contacts 5–6CS–8 and make contacts 2 through 7 of relay 5–6CS, respectively, during the reception of the third digit to store the digit in register 1102.

In addition, during the reception of the third digit, the operation of relay 2–GCC applies ground via sixth address count circuit 508 to lead 505 in the same manner as previously described with respect to second address count circuit 501. The ground on lead 505 is then applied by way of the break contact of contacts 8–TR–4, FIG. 6, and the break contact of contacts 6–ZS–2 to the winding of relay 6–ZS which operates and locks to lead 401 by way of its own make contact. Relay 6–ZS operated transfers the holding ground for relay 5–6CS to lead 402 via the make contact of contacts 6–ZS–1. The subsequent release of relay 2–GCC then releases relay 5–6CS.

*Registering the home address digits*

The last address is always the home address of the calling subscriber and therefore in accordance with prescribed operating procedures is always preceded by the digit zero. Accordingly, in the event that the maximum of six addressee stations are registered, the seventh address must be the home address of the calling subscriber and is therefore preceded by the zero digit.

Upon the reception of the zero digit, relay 2–GCC applies ground to lead 506 which extends in FIG. 6 to break contact 6–ZS–4. Lead 506 is therefore open and the ground thereon provides no function. The ground applied to lead L4 by multifrequency receiver 201 is, at this time, extended to the winding of relay 12–ZA by way of break contact 8–TR–3, make contact 6–ZS–3, and the break contact of contacts 5–6CS–8 operating relay 12–ZA which locks by way of its own make contact and lead 1202 to conductor 401. With relay 12–ZA operated, the holding path for relay 6–ZS is transferred to lead 402 by way of the make contact of contacts 12–ZA–1. In addition, relay 12–ZA operated completes an operating path for relay 6–7AS by way of the break contact of contacts 6–7AS–9, the break contact of contacts 12–7UK–1 and make contact 12–ZA–3, operating relay 6–7AS which locks by way of its make contact to lead 401. With lead 6–7AS operated, the holding path for relay 12–ZA is transferred to lead 402 by way of the make contact of contacts 6–7AS–1. At the termination of the reception of the zero digit, relay 2–GCC releases opening the holding paths for relays 12–ZA and 6–ZS and these relays release.

Upon the reception of the first digit of the home address, the ground applied to lead 506 by the reoperation of relay 2–GCC is passed through break contact 6–ZS–4, break contact 12–ZA–4, the make contact of contacts 6–7AS–10 and the break contact of contacts 6–7BS–9 to the winding of relay 6–7BS. Relay 6–7BS operated locks by way of its make contact to lead 401 and transfers the holding path for relay 6–7AS to lead 402 via the make contact of contacts 6–7BS–1.

Figure 12:
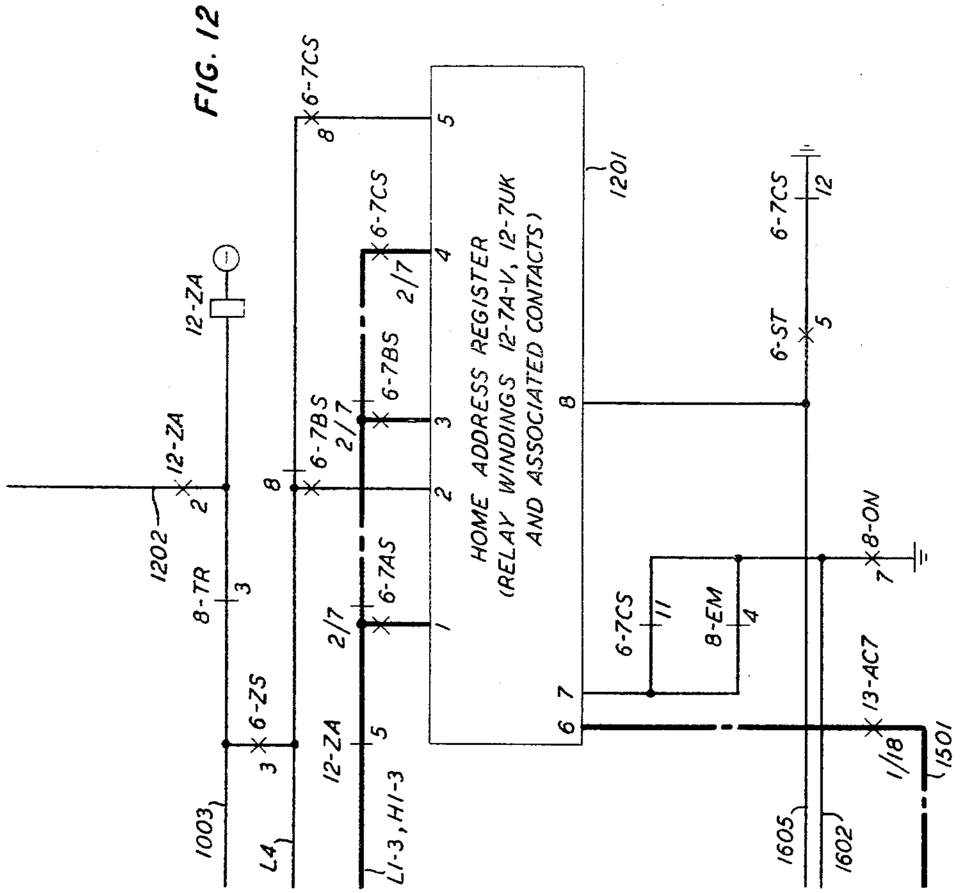

With relay 6–7AS operated leads L1 through L3 and H1 through H3 extend through break contact 12–ZA–5, FIG. 12, and make contacts 2 through 7 of relay 6–7AS to the home address register, generally indicated by block 1201. Accordingly, the first digit of the calling subscriber is stored by register 1201 and the operated register relays lock to lead 1602 by way of break contact 8–EM–4 or break contact 6–7CS–11 in shunt thereto. The subsequent release of relay 2–GCC then opens the holding path of relay 6–7AS and the latter relay releases.

Upon the reception of the second digit of the home address, relay 2–GCC reoperates, applying ground to lead 506 and thence by way of the break contacts of relays 6–ZS and 12–ZA, the break contact of contacts 6–7AS–10, the make contact of contacts 6–7BS–10 and the break contact of contacts 6–7CS–9 to the winding of relay 6–7CS. Accordingly, relay 6–7CS operates and locks by way of its make contact to lead 401 and in addition thereto transfers the holding path of relay 6–7BS to lead 402 via the make contact of contacts 6–7CS–1.

With relay 6–7BS operated, conductor L4 extends to register 1201 and conductors L1 through L3 and H1 through H3 extend to register 1201 by way of the make contact of contacts 6–7BS–8 and make contacts 2 through 7 of relay 6–7BS, respectively. Accordingly, the second digit of the home address is registered in address register 1201. The subsequent release of relay 2–GCC then releases relay 6–7BS.

Upon the reception of the third digit of the home address, relay 2–GCC reoperates and the ground on lead 506 is applied by way of the break contact of contacts 6–7BS–10, make contact 6–7CS–10 and the break contact of contacts 6–ST–4 to the winding of relay 6–ST. Relay 6–ST operated locks by way of its own make contact, and make contact 8–ON–6 and transfers the holding path of relay 6–7CS to lead 402 via the break contact of contacts 8–TR–2 and the make contact of contact 6–ST–1.

With relay 6–7CS operated, lead L4 is extended to register 1201 by way of make contact 6–7CS–8 and leads L1 through L3 and H1 through H3 are extended to register 1201 by way of make contacts 2 through 7 of relay 6–7CS. Accordingly, the third digit of the home address is registered in address register 1201. The subsequent termination of the third digit releases relay 2–GCC which in turn, releases relay 6–7CS.

Upon the release of relay 6–7CS, an operating path is completed for relay 16–1UK, which path may be traced through the break contact of contacts 16–1UK–3, the make contacts of the operated one of relays 10–1A through 10–1C, 10–1G through 10–1K and 10–1P through 10–1S, as shown in register 1009, and thence by way of lead 1605 to make contact 6–ST–5, FIG. 12, and break contact 6–7CS–12 to ground. Accordingly, relay 16–1UK operates and locks by way of its make contact to lead 1602 by way of lead 1601. Similarly, relay 12–7UK is operated by the ground on lead 1605 and locks to ground on lead 1602. In a similar manner, the other UK relays included in the registers that are storing digits are operated by the ground on lead 1605 and lock to lead 1602.

As previously described, the digit zero is transmitted by the calling subscriber immediately prior to the home address. In the event that the number of addresses is less than six, the reception of the zero digit operates relay 12–ZA to steer the home address into the home address register 1201. Assume, for example, that five addressee stations are called, the digit zero is received at the termination of the fifth address. At this time, as previously described, relay 5–6AS is operated. Accordingly, upon the reception of the digit zero, the ground applied to lead L4 is passed to lead 1003 by way of the make contact of contacts 5–6AS–8, FIG. 11. The ground on lead 1003 then extends to the winding of relay 12–ZA by way of break contact 8–TR–3 and relay 12–ZA locks, as previously described.

With relay 12–ZA operated, relay 6–7AS operates and locks, as previously described, and, in addition thereto, with relay 5–6AS operated, transfers the holding ground for the latter relay to lead 402 by way of the make contact of contacts 6–7AS–1. The subsequent release of relay 2–GCC at the termination of the reception of the zero digit then releases relays 5–6AS and 12–ZA, leaving relay 6–7AS operated. It is thus seeen that the next address which, in this case, is the home address, is registered in address register 1201 and no digits are registered in sixth address register 1102. Accordingly, the five addresses of the addressee stations are registered in their appropriate address registers and the home address is registered in address register 1201 leaving the address relays in register 1102 de-energized and therefore leaving relay 11–6UK in register 1102 unoperated. In a corresponding manner, where there are less than five addressee stations, the digits of each addressee station are registered in a corresponding address register and the digits of the home address are invariably registered in address register 1201.

Returning now to relay 16–1UK operated at the termination of the reception of the addresses, relay 17–TP1 is released upon the opening of the break contact of contacts 16–1UK–1. This opens the previously-described operating path for slow-to-release relay 17–TMC and it releases. Upon the release of relay 17–TMC ground is applied through make contact 8–ON–5, break contact 8–TR–1, the make contact of contacts 16–1UK–1, the winding of relay 17–TP2, the break contact of contacts 17–TP2–1, and break contact 17–TMC–1, operating relay 17–TP2 which locks by way of its make contact around break contact 17–TMC–1. With relay 17–TP2 operated, an operating path for relay 17–TMC is recompleted through make contact 17–TP2–2. With relay 17–TP1 released, the timing period for the reception of the addresses is terminated. The operation of relay 17–TP2 now initiates the timing period for the message interval.

*Transmitting the answer back sequence*

Returning now to relay 12–7UK operated, which operation occurs upon the registration of the home address in address register 1201, a supplementary holding path for relay 8–ON is completed by way of break contact 2–EC–2 and the make contact of contacts 12–7UK–3. In addition, an operating path for relay 2–AN in the data set, generally indicated by block 204, is completed by way of break contact 2–EC–1, the break contact of contacts 8–TR–5, make contact 12–7UK–2 and make contact 8–ON–10.

Data set 204, which is of the type described in the above-identified patent of T. L. Doktor et al., includes hybrid circuit 205, amplifiers 206 and 207, filters and transfer switches, generally indicated by block 208, discriminator 209, timer 210, a logic circuit, generally indicated by block 211, and modulator 212. As described in the T. L. Doktor et al. patent, when relay 2–AN, similarly identified as relay AN in the patent, is operated, modulator 212 is arranged to apply a signal in a first band to hybrid 205 and thence across the output line identified herein as conductors TO and RO. In addition, discriminator 209 is arranged to detect signals received in a second frequency band, and timer 210 is arranged to time the duration of the signals. Upon the reception of the signals from a remote calling data set, timer 210 then functions to instruct logic circuit 211 to operate relay 2–CY, similarly identified in the patent as relay CY. Accordingly, with relay 2–AN operated, a signal is applied across conductors TO and RO and thence to the calling subscriber by way of conductors T and R. The calling subscriber's data set then returns a signal which is received by discriminator 209, and after an appropriate interval timer 210 instructs logic circuit 211 to operate relay 2–CY. With relay 2–CY operated, an operating path for relay 2–CYD is completed by way of make contact 2–CY–1. This indicates that the connect or "hand-shaking" sequence of the data sets is complete and the data sets are ready to interchange data signals.

Figure 7:
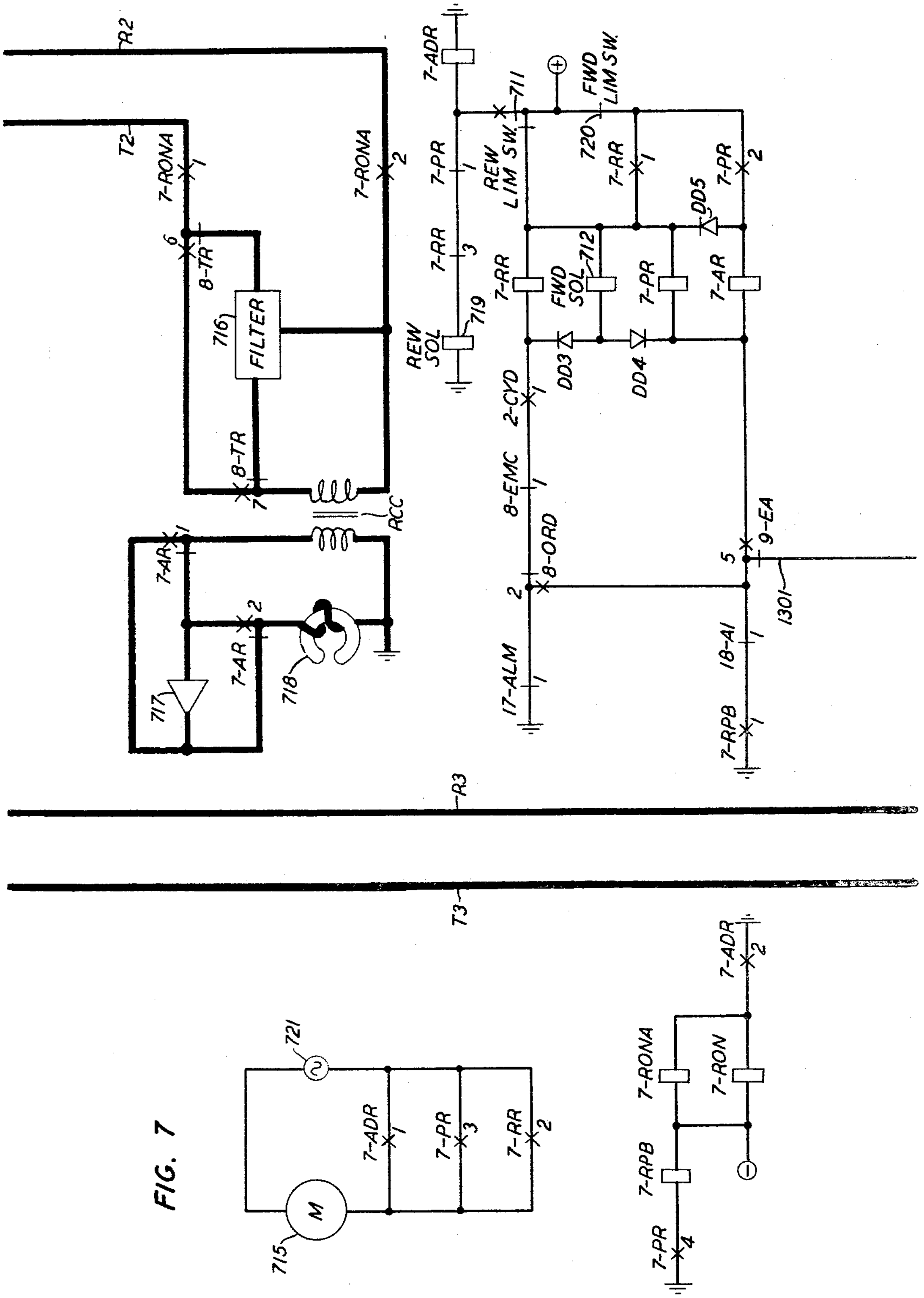

With relay 2–CYD operated, relay 7–RR in the magnetic recorder circuit shown in FIG. 7 is energized. The energizing path for relay 7–RR may be traced through the normally-closed contact of rewind limit switch 711, the winding of relay 7–RR, make contact 2–CYD–1, break contact 8-EMC–1, the break contact of contacts 8–ORD–2, and break contact 17–ALM–1. In addition, forward solenoid 712, which in series with diode DD3 shunts the winding of relay 7–RR, is similarly energized. The structure and functions of the magnetic recorder shown in FIG. 7 will be described in detail hereinafter.

Figure 8:
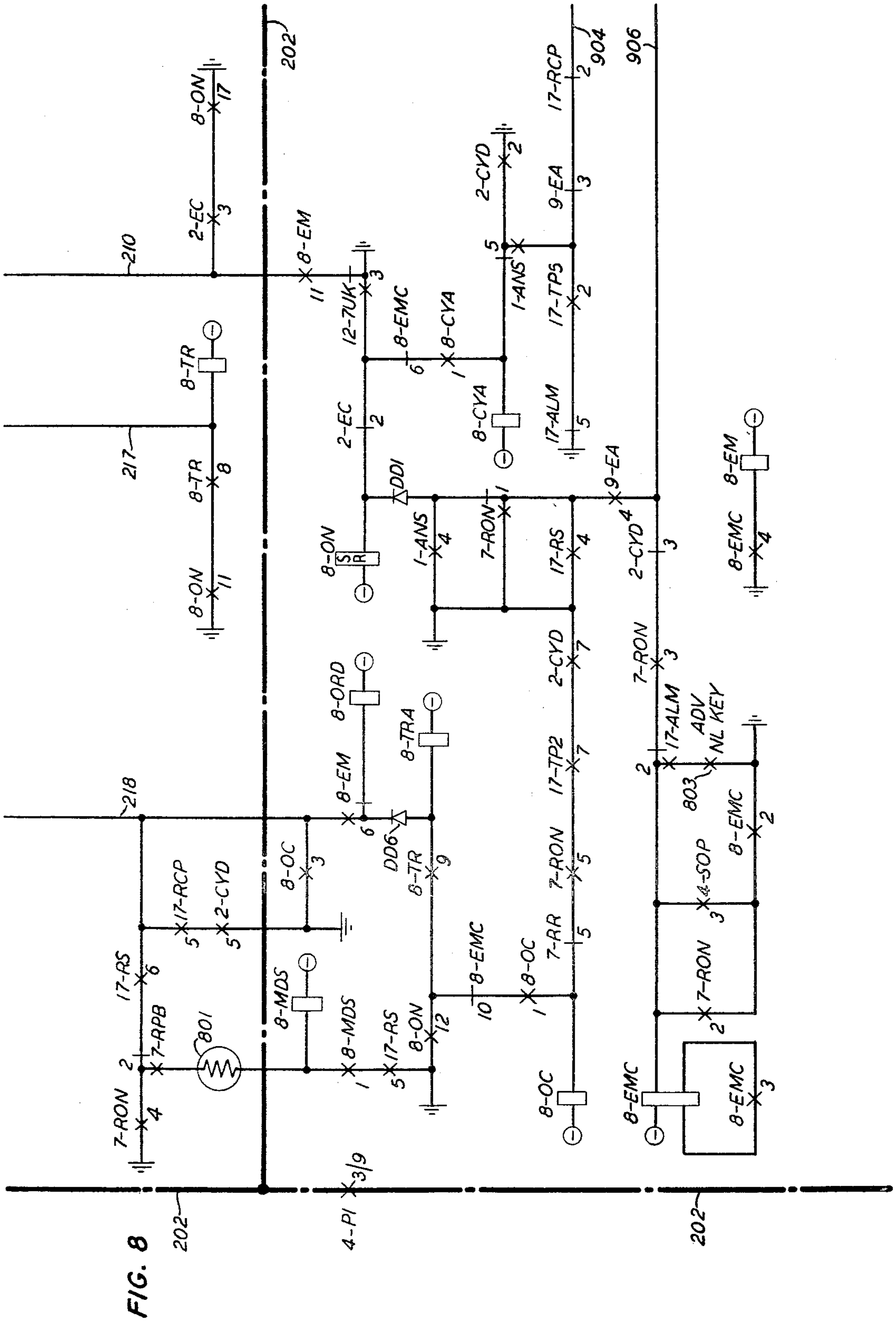

Returning now to relay 2–CYD operated, an operating path is completed for relay 9–ABP by way of lead 904, break contact 17–RCP–2, FIG. 8, break contact 9–EA–3, the make contact of contacts 1–ANS–5 and make contact 2–CYD–2. Relay 9–ABP operated completes a holding path for relay 9–ABH by way of make contact 9–ABP–2. In addition, relay 9–ABP operated completes an operating path for relay 9–ABC and relay 9–C1, which latter relay is in parallel with relay 9–ABC. This operating path may be traced by way of make contact 9–ABP–1 and make contact 9–ABH–4.

With relay 9–ABC operated, the input to modulator 212 is extended to distributor 305 output lead 311 by way of make contact 9–ABC–3, negative battery normally applied to the input of modulator 212 by way of the break contact of contacts 9–ABC–4 is removed and transferred to lead 310 by way of the make contact of contacts 9–ABC–4. In addition, with relay 9–ABC operated, an operating path for relay 9–TS1 is completed by way of the break contact of contacts 9–TS2–1, the break contact of contacts 9–TS3–1, the break contacts of relays 9–TS4 through 9–TS20, not shown, the break contact of contacts 9–TS21–1, the break contact of contacts 9–EAB–1 and make contact 9–ABC–2. In addition, the operation of relay 9–ABC recompletes an energizing path for trip magnet 303, which path may be traced by way of lead 901, the contacts of relays 9–CCB and 9–CCA, the make contact of contacts 9–ABC–1 and the contacts of relays 9–EA and 4–BSA.

The energization of trip magnet 303 initiates the generation of the answer back sequence by answer back mechanism 302 by releasing for a first rotation distributor 305. These answer back signals across leads 310 and 311 are now applied to modulator 212, with relay 9–ABC operated, as previously described. During the first revolution of distributor 305 output leads 310 and 311 are shorted, however, by suppression contact 9 which extends to drum 306, as described in the above-identified technical manual bulletin of the Teletype Corporation.

At the conclusion of the first revolution of distributor 305, drum 306 steps and cam contacts 304 momentarily close completing the previously-described operating path for relay 9–CCA. With relay 9–CCA operated, the energizing path for trip magnet 303 is opened and the ground extended through the make contact of contacts 9–ABC–1 is applied through the make contact of contacts 9–CCA–1, the break contact of contacts 9–CCB–3, the make contact of contacts 9–TS1–1 and the break contact of contacts 9–TS2–2 to the winding of relay 9–TS2 which locks by way of its own make contact and the break contacts of the succeeding TS relays.

With relay 9–TS2 operated, a holding path is completed for relay 9–TS1 by way of the make contact of contacts 9–TS2–1 to the ground on the make contact of contacts 9–TS1–1. The subsequent reopening of cam contacts 304 operates relay 9–CCB, as previously described, recompleting the energizing path of trip magnet 303 by way of the make contacts of relays 9–CCA and 9–CCB. With relay 9–CCB operated, the previously-described holding path for relay 9–TS1 is opened and the latter relay releases. With trip magnet 303 re-energized, distributor 305 is released for a second revolution to transmit the first character of the answer back sequence, which sequence comprises the identification of the multiple address circuit, the address of the addressee station and the address of the calling subscriber. Since the latter information has not been received, the three digit addresses will have zero digits inserted therein. The sequence will, therefore, comprise the characters MA1 <000–000>.

Upon the first step of drum 306, the cams thereon are arranged to code distributor 305 with the character "Carriage Return," and distributor 305, in turn, applies in series the elements of the character to modulator 212 which, in turn, transmits a frequency shift sequence in accordance with the applied character elements to the calling subscriber.

At the end of the second revolution of distributor 305, drum 306 again steps, cam contacts 304 reclose, and relay 9–CCA releases, as previously described. This extends the ground at the make contact of contacts 9–ABC–1 through the break contact of contacts 9–CCA–1, the make contact of contacts 9–CCB–3, the break contacts of contacts 9–TS1–1, the make contact of contacts 9–TS2–3, and the break contact of contacts 9–TS3–2 to the winding of relay 9–TS3 which locks by way of the break contacts of the succeeding TS relays.

Relay 9–TS3 operated transfers the locking path of relay 9–TS2 through the make contact of contacts 9–TS3–1 to the ground on the make contact of contacts 9–TS–2–3.

When cam contacts 304 subsequently reopen, relay 9–CCB reoperates, opening the previously-described holding path for relay 9–TS2 and the latter relay releases. The release of relay 9–CCB also recompletes the previously-described energizing path for trip magnet 303, releasing distributor 305 for its third revolution, and with drum 306 in its second step and coded for the character "Line Feed," this character is transmitted by data set 204 to the calling subscriber.

At the termination of the third revolution of distributor 305, cam contacts 304 reclose, drum 306 steps, relay 9–CCA reoperates, trip magnet 303 is de-energized, and relay 9–TS4, not shown, is operated in substantially the same manner as previously described with respect to relay 9–TS3. The subsequent reopening of cam contacts 304 reoperates relay 9–CCB and re-energizes trip magnet 303 and releases relay 9–TS3, in substantially the same manner as previously described, whereby distributor 305 is released for the fourth revolution. The coding on drum 306 now comprises the character "M" which is transmitted to the calling subscriber.

During the fifth revolution of distributor 305, relay 9–TS5, not shown, is operated, and drum 306 codes distributor 305 with the character "A." Similarly, for the sixth revolution of distributor 305, relay 9–TS6, not shown, is operated. At this time the first segment of distributor 305 is extended to output lead 311 by way of lead 215, make contact 9–ABC–5, FIG. 2, the make contact of contacts 9–TS6–1, and break contacts 9–TS5–1. Accordingly, distributor 305 is coded with the digit "1" identifying the number of the multiple address circuit, which digit is thus transmitted to the calling subscriber.

During each succeeding revolution of distributor 305, a corresponding TS relay is operated. At the termination of the twentieth revolution ground is applied through the make contact of contacts 9–TS20–1, FIG. 9, and the break contact of contacts 9–TS21–2 to the winding of relay 9–TS21 which locks by way of the break contact of contacts 9–EAB–1. It is noted here that during the ninth through eleventh and thirteenth through fifteenth revolutions of distributor 305, drum 306 applies no signals to distributor 305, whereby zero digits are transmitted during these distributor revolutions. It is noted further that during the seventeenth revolution of distributor 305 with relay 9–TS17 operated, a short is placed across leads 310 and 311 by way of the make contact of contacts 9–TS17–1, break contact 9–TS16–1 and the break contacts of relays 9–TS6 and 9–TS5 whereby the signals are suppressed during this distributor revolution.

Returning to relay 9–TS21 operated, it is noted that during the twenty-first revolution of distributor 305, drum 306 is coded with a transmitter start character signaling the calling subscriber that transmission therefrom should commence. At the conclusion of the twenty-first revolution, cam contacts 304 reclose, relay 9–CCA reoperates, drum 306 steps to home, magnet 303 is de-energized, as previously described, and the ground applied to the break contact of contacts 9–TS20–1 is extended through make contact 9–TS21–3 and the break contact of contacts 9–EAB–2 to the winding of relay 9–EAB which locks by way of make contact 9–ABC–2.

With relay 9–EAB operated, a locking path for relay 9–TS21 is transferred to the ground on make contact 9–TS21–3 by way of the make contact of contacts 9–EAB–1. Relay 9–EAB operated also completes an energizing path for relays 9–EAA and 9–EA, which relays are arranged in parallel. The energizing path for these relays is traced by way of make contact 9–EAB–3, diode DD2, make contact 9–ABP–1 and make contact 9–ABH–4, relays 9–EA and 9–EAA locking by way of lead 906, make contact 9–EA–4, FIG. 8, the make contact of contacts 7–RON–1 if relay 7–RON is operated, as described hereinafter or the break contact of contacts 7–RON–1 if the relay is released, and make contact 1–ANS–4.

With relay 9–EA operated, the previously-described energizing path for trip magnet 303 by way of break contact 9–EA–2 is opened, precluding the subsequent re-energization of trip magnet 303. The subsequent reopening of cam contacts 304 opens the locking path of relay 9–TS21 and the relay releases.

Returning now to relay 9–EA operated, the previously-described energizing path for relay 9–STM is opened, releasing relay 9–STM which, in turn, opens the energizing path for motor 301. In addition, relay 9–EA operated releases relay 9–ABP. Relay 9–ABP released, releases, in turn, relays 9–ABC, 9–C1 and 9–ABH. In addition, relays 9–CCA and 9–CCB are released with relay 9–ABP released. The release of relay 9–ABC opens the locking path for relay 9–EAB and the latter relay releases.

This terminates the answer back sequence, restoring answer back mechanism 302 to its initial condition and releasing the answer back control relays shown in FIG. 9.

*Recording the message*

It is recalled that the operation of relay 2–CYD operates, in turn, relay 7–RR and energizes forward solenoid 712 in the magnetic recorder and control circuit shown in FIG. 7. The magnetic recorder, in addition to forward solenoid 712, includes rewind limit switch 711, motor 715, magnetic reading and recording head 718, rewind solenoid 719 and forward limit switch 720. As is well known in the art, with motor 715 energized together with forward solenoid 712, a magnetic recording surface, not shown, is driven in a forward direction past the air gap of magnetic head 718. Conversely, with rewind solenoid 719 energized, the magnetic surface is driven in the reverse direction toward its initial position. At the initial position, rewind limit switch 711 is released in the position shown in FIG. 7. As the magnetic surface or record is driven from the initial position, rewind limit switch 711 operates and remains operated until the record is restored to the initial position. Forward limit switch 720, which is normally unoperated, as shown in FIG. 7, is operated when the magnetic record reaches its forward limit, and is released when the record is driven in the reverse direction away from the forward limit.

When relay 7–RR operates, as previously described, motor 715 is connected to energizing source 721 by way of make contact 7–RR–2. In addition, the operation of relay 7–RR provides a locking path by way of make contact 7–RR–1 and the normally closed contact of forward limit switch 720, which path also holds forward solenoid 712 energized. Accordingly, with motor 715 and forward solenoid 712 energized, recording head 718 is prepared to apply signals to the record and the record, in turn, is driven in a forward direction.

Upon the record being driven away from the home position, rewind limit switch 711 operates, completing an obvious operating path for relay 7–ADR. Relay 7–ADR operated completes, in turn, operating paths for relays 7–RON and 7–RONA by way of make contact 7–ADR–2. In addition, relay 7–ADR operated prepares a supplementary energizing path for motor 715 by way of make contact 7–ADR–1.

The operation of relay 7–RONA functions to render recording head 718 responsive to signals received from the calling subscriber. These signals, as previously described, are applied across the lower primary winding of repeat coil RCA, the lower secondary winding of repeat coil RCA being connected to the primary winding of repeat coil RCC, FIG. 7, by way of the make contact of contacts 6–ST–3, FIG. 1, conductor T2, make contact 7–RONA–1, FIG. 7, the break contact of contacts 8–TR–6, filter 716, which filter passes signals in the signaling band received from the calling subscriber, the break contact of contacts 8–TR–7, the primary winding of repeat coil RCC, make contact 7–RONA–2, conductor R2 and the make contact of contacts 6–ST–2 and thence back to repeat coil RCA. The secondary winding of repeat coil RCC is, in turn, connected to recording head 718 by way of the break contact of contacts 7–AR–1, amplifier 717, and the break contact of contacts 7–AR–2. Accordingly, the recorder proceeds to record the signals received from the calling subscriber.

Since, at this time, the answer back sequence has not been concluded, the initial recording will be a marking or idle signal, which signal is normally transmitted by the calling subscriber when not transmitting data. At the conclusion of the answer back sequence, the calling subscriber starts transmitting the data message, as previously described, and the data message is recorded on the magnetic record. The calling subscriber then terminates the message by sending an end-of-message signal followed by a prolonged disconnect signal and then disconnects. Accordingly, the record has recorded thereon the data message, the end-of-message signal, and the prolonged disconnect signal.

When the prolonged disconnect signal is received, timer 210 times out and operates relay 2–S, as disclosed in the above-identified T. L. Doktor et al. patent. With relay 2–S operated, relay 2–CY releases, releasing in turn, relay 2–CYD. The release of relay 2–CYD completes an operating path for relay 8–EMC by way of the make contact of contacts 7–RON–1, make contact 9–EA–4, break contact 2–CYD–3, make contact 7–RON–3 and the break contact of contacts 7–ALM–2, operating relay 8–EMC which locks by way of make contact 7–RON–2 and make contact 8–EMC–2. In addition, a relay winding shunt path is prepared by way of make contact 8–EMC–3 rendering the relay slow to release. Relay 8–EMC operated completes an obvious energizing path for relay 8–EM and extends supplementary ground to sleeve lead S by way of make contact 8–EMC–5. In addition, relay 8–EMC operated opens the previously-described energizing path for relay 7–RR and for forward solenoid 712, whereby relay 7–RR releases and forward solenoid 712 is de-energized. This will restore the recorder to its initial condition, as described hereinafter.

The previously-described operation of relay 2–S completes an operating path for relay 8–TR which may be traced by way of make contact 2–S–1, break contact 8–OC–2, the make contact of contacts 9–EAA–1, and lead 217, relay 8–TR locking by way of its own make contact and make contact 8–ON–11. With relay 8–TR operated, an operating path is completed for relay 8–TRA by way of make contact 8–TR–9 and make contact 8–ON–12. It is noted that the ground on the winding of relay 8–TRA is also extended through diode DD6, the make contact of contacts 8–EM–6 and lead 218 to the winding of relay 2–S whereby the latter relay is held operated until the subsequent release of relay 8–EM.

Returning now to the operation of relay 8–TR, the previously-described operating and locking path for relay 17–TP2 is open, releasing the later relay. The release of relay 17–TP2, in turn, releases relay 17–TMC. This completes the timing of the received message interval.

With relay 17–TMC released, an operating path for relay 17–TP3 is completed by way of make contact 8–TR–10, break contact 17–TP5–1, the break contact of contacts 2–CYD–4, the winding of relay 17–TP3, the break contact of contacts 17–TP3–1 and break contact 17–TMC–1 and relay 17–TP3 locks through its own make contact, shunting break contact 17–TMC–1. The operation of relay 17–TP3 now completes an obvious energizing path for relay 17–TMC. With relay 17–TP3 operated, a new timing period, as described hereinafter, is initiated for the interval between the termination of the message and the completion of the call to the first addressee station.

Relay 8–TR operated also completes an operating path for relay 4–1AS which path extends from the winding of relay 4–1AS through the break contact of contacts 4–1AS–1, the make contact of contacts 4–BSA–2, break contact 4–S1–1 and make contact 8–TR–11 to lead 401. Lead 401, in turn, now extends to ground in FIG. 6 via the make contact of contacts 8–TR–2 and make contact 8–ON–6. Relay 4–1AS operated locks to lead 401 in the same manner as previously described.

Returning now to data set 204, the operation of relay 2–S also initiates a delayed release on relay 2–AN. Relay 8–TR operated also opens the previously-described operating path of relay 2–AN and completes an operating path for relay 2–OR by way of the make contact of contacts 8–TR–5, make contact 12–7UK–2 and make contact 8–ON–10. Relay 2–OR, however, will not operate until the termination of the disconnect signal as described in detail in the above-identified T. L. Doktor et al. patent. Accordingly, at the termination of the disconnect signal and the subsequent disconnect by the calling subscriber, relay 2–OR operates and, as described in the T. L. Doktor et al. patent, modulator 212 is arranged to transmit to an addressee or terminating station, discriminator 209 is arranged to receive from the terminating station and timer 210 to time the received signals. In addition, the disconnect of the calling subscriber opens the energizing path of relay 1–A and relay 1–A, in turn, releases relay 1–ANS. The trunk circuit is thus disconnected from the outgoing line circuit and the trunk line frame of the PBX.

Returning now to the release of relay 7–RR and the de-energization of solenoid 712, with relay 7–RR released, an energizing path for rewind solenoid 719 is completed by way of break contact 7–RR–3, break contact 7–PR–1 and rewind limit switch 711. Accordingly, the magnetic record is rewound until the initial or home position is reached, thereupon rewind limit switch 711 restores to its unoperated position, releasing, in turn, relay 7–ADR and de-energizing rewind solenoid 719. The release of relay 7–ADR opens the energizing path for motor 715 and, in addition thereto, opens the operating paths for relays 7–RON and 7–RONA.

With relay 7–RON released, relay 8–EMC releases, releasing in turn relay 8–EM. In addition, relay 7–RON released opens the previously-described locking paths for relays 9–EA and 9–EAA and these latter relays release. The release of relay 9–EA recompletes the operating path for relays 9–ABH and 9–STM and relay 9–STM, in turn, re-energizes motor 301.

With relay 8–EM released, an operating path for relay 8–ORD is completed by way of the break contact of contacts 8–EM–6, diode DD6, make contact 8–TR–9 and make contact 8–ON–12. The release of relay 8–EM also opens the holding path for relay 2–S and with relay 2–S released and relay 2–OR operated, data set 204 is placed in the originating condition, whereby a call may be initiated to an addressee station.

With relay 8–ORD operated, an operating path for relay 13–AC1 is completed, which path may be traced by way of the make contact of contacts 16–1UK–4, the break contact of contacts 15–OA–1, lead 1301, the break contact of contacts 9–EA–5, FIG. 7, the make contact of contacts 8–ORD–2 and break contact 17–ALM–1. The operation of relay 13–AC1 extends leads L1 through L3 and H1 through H3 to the digit coding relays 15–HL1 through 15–HH3, 15–TL1 through 15–TH3 and 15–UL1 through 15–UH3 shown in FIG. 15. Tracing the paths of leads L1 through L3 and H1 through H3 from the windings of relays 10–1A through 10–1F, these leads similarly identified and including (H) prior to each designation extend to cable 1501. Similarly, leads L1 through L3 and H1 through H3 which extend to relays 10–1G through 10–1P also extend to multiple cable 1501 wherein each of the leads are similarly identified but preceded by (T). In addition, leads L1 through L3 and H1 through H3 which extend to the windings of relays 10–1P through 10–1V also extend to cable 1501 and are similarly designated but preceded by (U).

Figure 15:
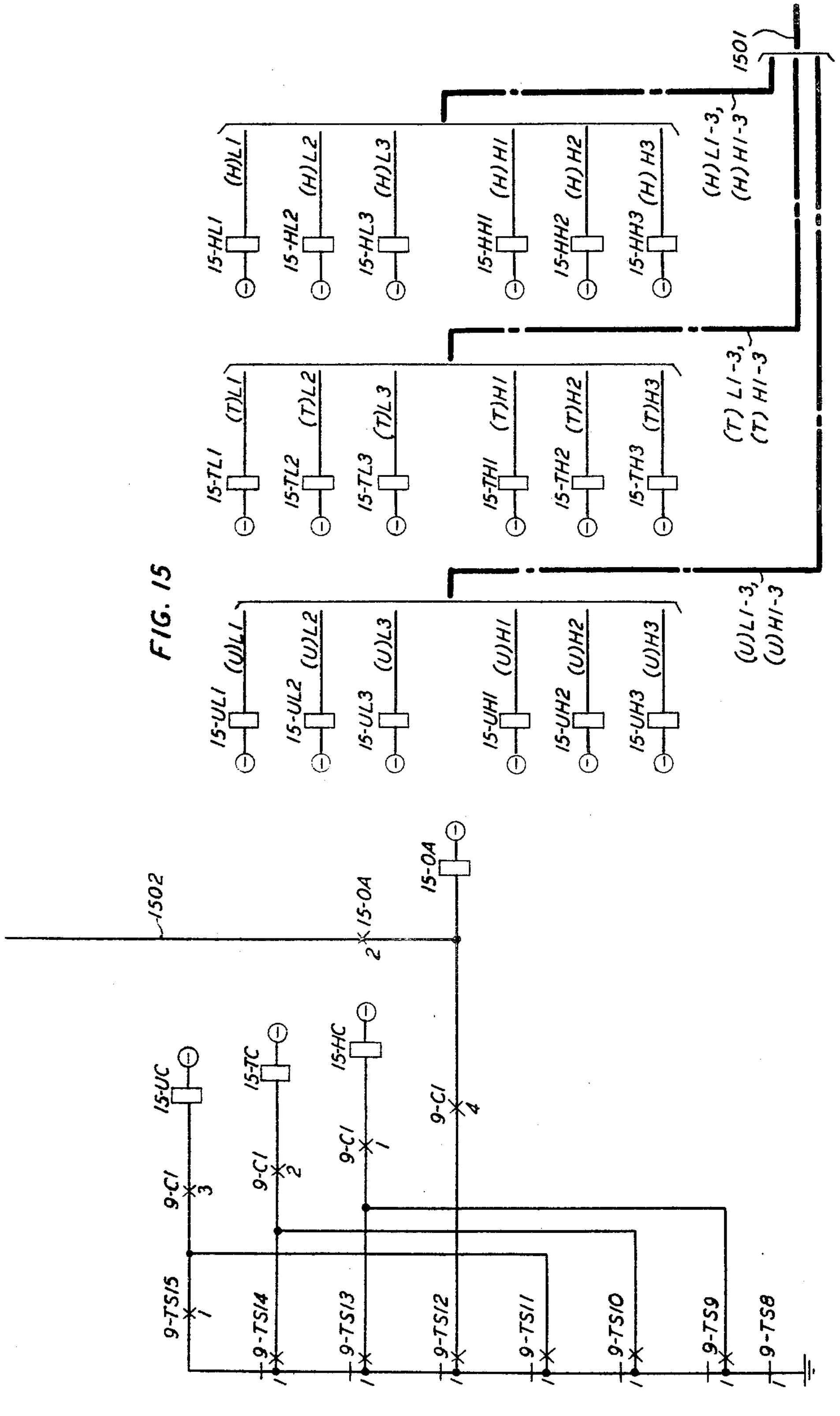

Tracing cable 1501 through make contacts 1 through 18 of relay 13–AC1 and thence to FIG. 15, leads (U)L1 through (U)L3 and (U)H1 through (U)H3 reappear in FIG. 15 and are connected to relays 15–UL1 through 15–UL3 and 15–UH1 through 15–UH3, respectively. Similarly, leads (T)L1 through (T)L3 and (T)H1 through (T)H3 are connected by way of contacts of relay 13–AC1 in cable 1501 to the windings of relays 15–TL1 through 15–TL3 and 15–TH1 through 15–TH3, respectively. In the same manner, leads (H)L1 through (H)L3 and (H)H1 through (H)H3 are connected to the windings of relays 15–HL1 through 15–HL3 and 15–HH1 through 15–HH3. Accordingly, it is thus seen with relay 13–AC1 operated the windings of relays 15–HL1 through 15–HL3 are connected to the windings of relays 10–1A through 10–1C, respectively, and the windings of relays 15–HH1 through 15–HH3 are connected to the windings of relays 10–1D through 10–1F, respectively. Similarly, the other digit coding relays are connected to corresponding register relays in address register 1009 with relay 13–AC1 operated. Accordingly, the three digits stored in address register 1009 are now stored by the digit coding relays since the locking ground applied to the register relays is applied in parallel to the coding relays. The function of the coding relays will be described hereinafter.

*Outpulsing the first address*

Recalling now that relay 8–ORD operated, the restoration of the recorder, an operating path is now completed for relay 1–OG by way of make contact 8–ORD–3 and break contact 17–ALM–3. With relay 1–OG operated, the trunk circuit is now connected to an outgoing line circuit on the line link frame of the PBX by way of tip lead R4 and the make contact of contacts 1–OG–1. In addition, with relay 1–OG operated, a direct current path is completed to the outgoing line circuit from negative battery through thermistor 103, break contact 1–RA–1, make contact 8–ORD–1, break contact 8–EM–1 and resistor 108, lower and upper windings of relay 1–A, make contact 1–OG–4, lower and upper primary winding of coil RCA, make contacts 1–OG–3, 1–OG–2 and 1–OG–1 to leads R4 and T4. As disclosed in the above-identified patent of H. H. Abbott et al., the tip lead extends to ground in the line circuit and the ring lead is connected to the line relay. To cooperate with the multiple address circuit, the line circuit is modified by also presenting ground to the other side of the line relay coil. The current through the two windings of relay 1–A is therefore opposing at this time, rendering the relay inoperative.

With the direct current connection established on lead R4, the line relay will operate and make a request for a register and, as disclosed in detail in the above-identified patent of H. H. Abbott et al., the register, upon connection with the trunk, presents battery on lead R4 and ground on lead T4. This results in no current flow through lower winding of relay 1–A, thus the previously-described direct current path on lead T4 causes relay 1–A to operate on its upper winding. Relay 1–A operated, in turn, completes an operating path for relay 1–RA by way of make contact 1–OG–5, the break contact of contacts 1–ANS–3 and make contact 1–A–1 and relay 1–RA locks by way of its own make contact, break contact 8–EM–7 and make contact 8–ON–13. With relays 1–OG and 1–RA operated, a D-C path is completed through the winding of relay 1–A to the outgoing line circuit, which path may be traced in part through make contact 1–OG–3, the upper primary winding of repeat coil RCA, the upper winding of relay 1–A, the make contact of contacts 1–RA–1, the make contact of contacts 8–ORD–1, break contact 8–EM–1, make contact 1–OG–4 and the lower primary winding of repeat coil RCA.

The operation of relay 1–RA completes an operating path for relay 4–P by way of break contact 4–P1–1, break contact 4–SOP–1, and make contact 1–RA–3, operating relay 4–P and thus completing a shunting path around the lower winding thereof by way of make contact 4–P–2 rendering the relay slow to release. With relay 4–P operated, an energizing path is prepared for relay 4–P1 through thermistor 405 and make contact 4–P–1, thermistor 405, rendering relay 4–P1 slow to operate.

The operation of relay 4–P–1 completes an operating path for relay 4–1BS, which path is substantially identical to the previously-described operating path of relay 4–1BS with the exception that the path is completed by way of make contact 4–P1-2 which shunts make contact 2–GCC–8. Relay 4–1BS operated locks to lead 401 and transfers the holding path for relay 4–1AS to lead 402 in the same manner as previously described, the ground on lead 402 in this case being maintained through make contact 4–P1–2. With ground on the winding of relay 4–1BS, this ground is extended through make contact 8–TR–12 and the break contact of contacts 4-S1–2 to the winding of relay 4–S1 which locks through its own make contact and make contact 8–ON–9. Relay 4–S1 operated opens the previously-described operating path for relay 4–1AS.

Figure 14:
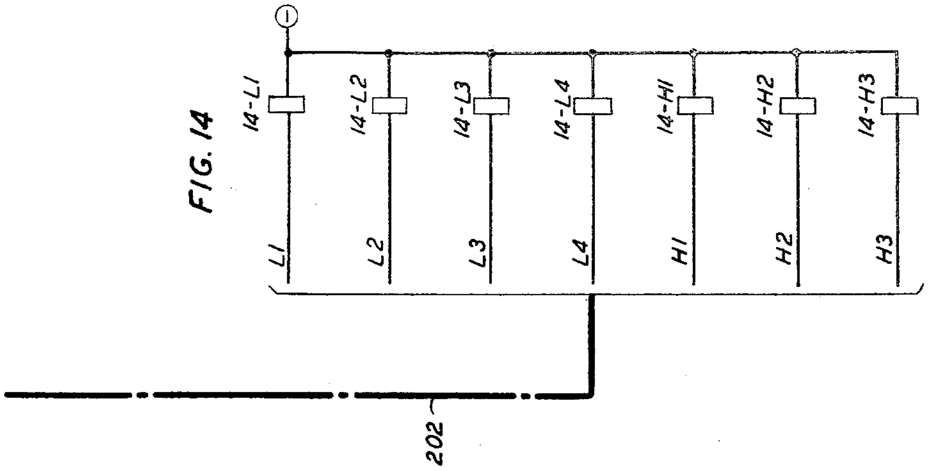

The operation of relay 4–P1 also extends cable 202 through make contacts 3 through 9 to the digit relays 14–L1 through 14–L4 and 14–H1 through 14–H3, shown in FIG. 14. Tracing the operating path of relay 14–L1, for example, it is noted that lead L1 extends to the winding of the relay and thence back over cable 202 through an appropriate make contact of relay 14–P1 to FIG. 10 where lead L1 reappears and with relay 4–1AS operated, lead L1 is then further extended to the winding of relay 10–1A. The windings of relays 14–L2, 14–L3 and 14–H1 through 14-H3 are similarly connected to the windings of relays 10–1B, 10–1C, 10–1D through 10–1F, respectively. Accordingly, selected ones of relays 14–L1 through 14–L3 and 14–H1 through 14–H3 are operated in accordance with the operated ones of relays 10–1A through 10–1F, the latter relays storing the first digit of the first address, as previously described.

The operation of relay 4–P1 also opens the previously described operating path of relay 4–P, and relay 4–P, which is slow to release by virtue of make contact 4–P–2, will be realeased after an appropriate interval of time.

Figure 13:
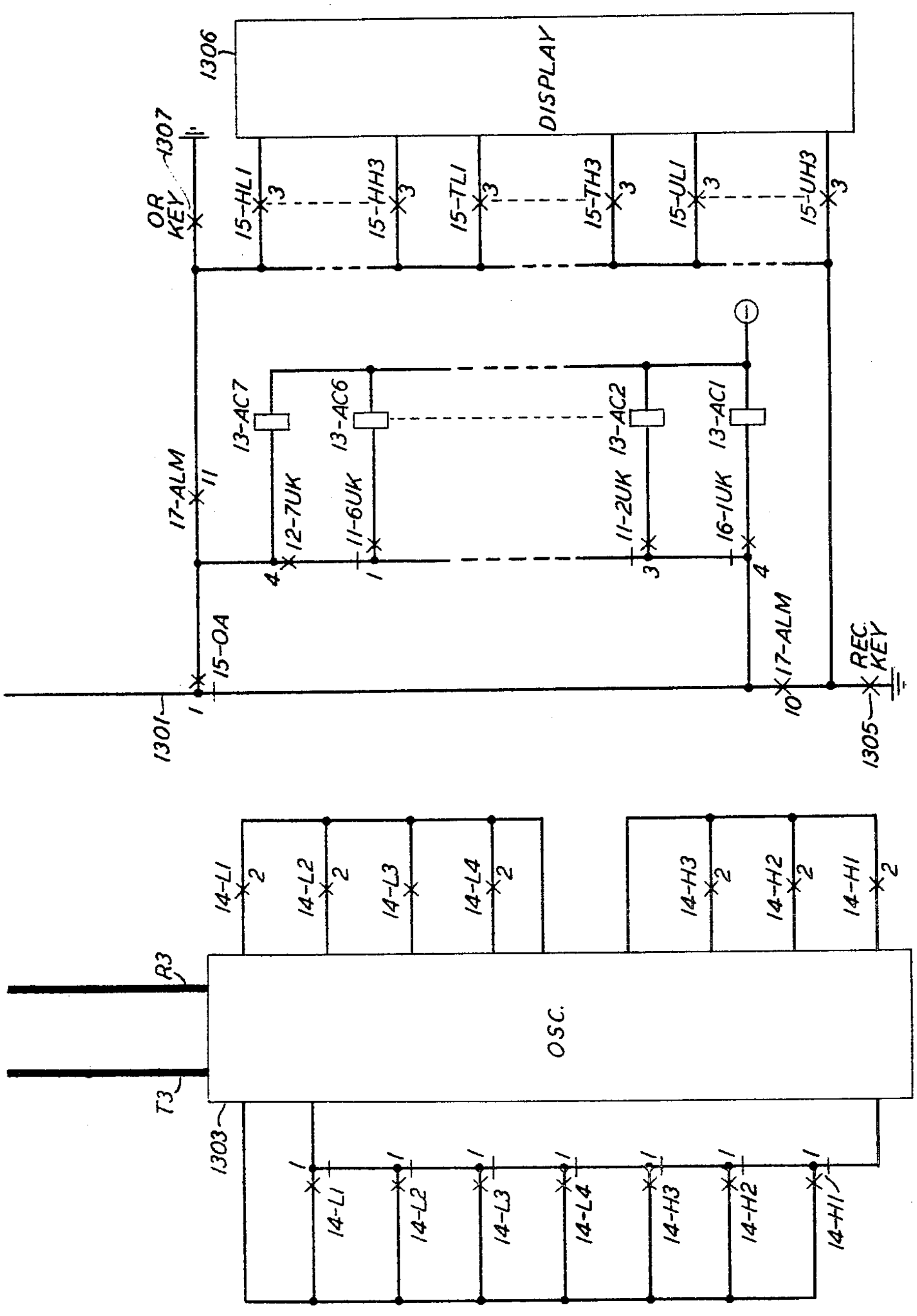

With selected ones of relays 14–L1 through 14–L3 and 14–H1 through 14–H3 operated, multifrequency oscillator 1303, FIG. 13, is accordingly arranged to transmit a two-frequency tone signal designating the first digit of the first address. The output of oscillator 1303 is applied across leads T3 and R3. Tracing lead T3 to FIG. 1, it then extends through make contact 8-ON–14 to negative battery and by way of capacitor CP3 to tip lead T. Conductor R3 traced to FIG. 1 extends through capacitor CP4 to ring lead R whereby oscillator 1303 is connected to the outgoing line circuit.

Oscillator 1303 has two frequency determining networks, not shown, the first of which is controlled by the number two make contacts of relays 14–L1 through 14–L4 and the second is controlled by the number two make contacts of relays 14–H1 through 14–H3. The operation of the selected ones of relays 14–L1 through 14–L4 controls the first frequency determining network and correspondingly arranges oscillator 1303 to transmit a first frequency tone. Similarly, the operation of the selected one of relays 14–H1 through 14–H3 controls the other frequency determining network to arrange oscillator 1303 to transmit a second frequency tone. In addition, the number one transfer contact of any one of relays 14–L1 through 14–L4 and 14–H1 through 14–H3 control the operating bias on oscillator 1303 whereby the operation of any one of the above-mentioned relays initiates the transmission of the two tones. Accordingly, with two of these relays operated, a two-frequency tone designating the first digit of the first address is transmitted to the PBX. An oscillator of this type suitable for use in this system is disclosed in reissue Patent 25,507, issued to L. A. Meacham on Jan. 7, 1964.

When relay 4–P releases, the operating path for relay 4–P1 is opened and the latter relay releases in turn. The release of relay 4–P1 removes the holding ground for lead 402 and relay 4–1AS consequently releases. In addition, the release of relay 4–P1 recompletes the operating path of relay 4–P and opens the operating path of the operated ones of relays 14-L1 through 14–L3 and 14–H1 through 14–H3, releasing the operated ones of the latter relays.

When relay 4–P reoperates, the operating path for relay 4–P1 is recompleted. The subsequent reoperation of relay 4–P1 extends ground through make contact 4-P1–2 and with relay 4–1BS operated, this ground is further extended to relay 4–1CS which operates and locks to lead 401. Relay 4–1CS operated transfers the holding path of relay 4–1BS to lead 402. In addition, relay 4–P1 operated opens the operating path of relay 4–P.

With relay 4–P1 operated, leads L1 through L4 and H1 through H3 which are connected to the windings of relays 14–L1 through 14–L4 and 14–H1 through 14–H3, are re-extended through cable 202, and with relay 4–1BS operated, conductors L1 through L4 and H1 through H3 are further extended to the windings of relays 10-1G through 10–1N. Accordingly, the appropriate ones of relays 14–L1 through 14–L4 and 14–H1 through 14–H3 are operated to designate the second digit of the first address. These operated relays, in turn, control oscillators 1303 to transmit the second digit.

When relay 4–P releases, relay 4–P1 releases in turn, removing the holding ground on lead 402 and thus releasing relay 4–1BS. In addition, the release of relay 4–P1 releases the operated ones of relays 14–L1 through 14–H3 and recompletes the operating path of relay 4–P.

When relay 4–P reoperates, the operating path for relay 14–P1 is recompleted. This re-extends ground through make contact 4–P1–2, which ground is further extended through the make contact of contacts 4–1CS–10, the make contact of contacts 16–1UK–2 and make contact 8–TR–13 to the winding of relay 8–SOP, operating the latter relay which locks through its own make contact, break contact 8–EM–8 and make contact 8–ON–15. The operation of relay 8–SOP, in turn, opens the operating path of relay 4–P.

With relay 4–P1 operated, the third digit of the first address is applied to relays 14–L1 through 14–H3 and the latter relays, in turn, control oscillator 1303 to transmit a multifrequency signal designating the third digit.

The subsequent release of relay 4–P opens the operating path of relay 4–P1. When relay 4–P1 releases, the operated ones of relays 14–L1 through 14–L3 release, terminating the transmission of the third digit. The transmission of the first address to the PBX is thus completed.

*Answer back and message play back to first addressee*

The PBX, upon the reception of the first address, rings the first addressee station if it is idle. The first addressee station, in response thereto, transmits a marking tone which constitutes the beginning of the "hand-shaking" sequence. This tone is received across the primary winding of repeat coil RCA and then supplied across conductors TO and RO to hybrid 205 of data set 204. The tone is accordingly detected by discriminator 209 and after an appropriate interval, timer 210 signals logic circuit 211 and relay 2–CY is consequently operated as described in the above-identified patent of T. L. Doktor et al.

With relay 2–CY operated, the previously-described operating path for relay 2–CYD is recompleted. This extends ground to the winding of relay 8–CYA via the break contact of contacts 1–ANS–5 and make contacts 2–CYD–2, operating relay 8–CYA which locks by way of its own make contact, break contact 8–EMC–6 and the make contact of contacts 12–7UK–3. The functions of relay 8–CYA will be described hereinafter with respect to the description of the alarm circuits.

Returning now to relay 2–CYD operated, the previously-described operating path of relay 17–TP3 is opened, releasing relay 17–TP3 which, in turn, releases relay 17–TMC. This terminates the timing period between the transmission of the address and the response of the addressee station.

With relay 2–CYD operated, an operating path is completed for relay 17–TP4 which path may be traced through make contact 8–TR–10, break contact 17–TP5–1, the make contact of contacts 2–CYD–4, break contact 17–RS–1, the winding of relay 17–TP4, the break contact of contacts 17–TP4–1 and break contact 17–TMC–1, operating relay 17–TP4 which locks through its own make contact shunting the contact of relay 17–TMC.

The operation of relay 17–TP4 initiates a new timing period wherein the circuit pauses to absorb the answer back from the addressee station. With relay 17–TP4 operated, the operation of the timing circuit is initiated, which timing circuit includes timing capacitor CP5, FIG. 18. It is noted that positive battery is normally applied to capacitor CP5 by way of the break contacts of relay 17–TP1 through 17–TP5. Thus the operation of relay 17–TP4 removes the application of the positive battery and capacitor CP5 proceeds to charge to negative battery through make contact 17–TP–4 and resistor 1801. After a predetermined interval of time, the potential on capacitor CP5, which potential is applied to the base of transistor Q1 is sufficiently negative to forward bias the transistor and turn it on. When transistor Q1 turns on, transistor Q2, in turn, is forward biased, drawing collector current through the winding of relay 18–TM.

Relay 18–TM operated completes an operating path for relay 17–RS by way of the make contact of contacts 17–TP4–5, the break contact of contacts 17–TP1–5, break contact 8–EMC–7, diode DD7 and make contact 18–TM–1, operating relay 17–RS which locks through its own make contact, break contact 8–EM–9 and make contact 8–ON–16. The operation of relay 17–RS, in turn, releases relay 17–TP4 and with relay 17–TP4 released, positive battery is reapplied to capacitor CP5, thus recycling the timer and releasing relay 18–TM.

The release of relay 17–TP4 also opens the operating path of slow-to-release relay 17–TMC and with relay 17–RS operated, the operating path for relay 17–TP5 is completed through make contact 17–RS–3 and break contact 17–TMC–1 when relay 17–TMC releases. The operation of relay 17–RS also prepares a suplementary locking path for relays 9–EA and 9–EAA when these relays are operated, by way of make contact 17–RS–4, FIG. 8.

With relay 17–TP–5 operated, the positive battery is again removed from the plate of capacitor CP5 and a new timing interval is initiated. This new timing interval will time the duration of the message as described hereinafter. In addition, the operation of relay 17–TP5 completes an operating path for relay 9–ABP which may be traced by lead 904, break contact 17–RCP–2, break contact 9–EA–3, make contact 17–TP5–2 and break contact 17–ALM–5. Since relay 9–ABH is operated at this time, the operating paths for relays 9–ABC and 9–C1 are completed.

The operation of relay 9–ABC completes the previously-described operating path for relay 9–TS1. In addition, with relay 9–ABC operated, the previously-described energizing path for trip magnet 303 is recompleted. Accordingly, the answer back sequence is reinitiated, starting with the first revolution of distributor 305, the momentary operation of distributor cam contacts 304 near the conclusion of the revolution, and the advancing of drum 306. This, as previously described, is also accompanied by the operation of relays 9–CCA and 9–CCB together with the release of these relays during each alternate rotation of distributor 305. Additionally, relays 9–TS2 through 9–TS21 successively operate with each distributor rotation. Thus, as previously described, the answer back sequence is sent to the addressee station.

During the answer back sequence, and, more specifically, when relay 9–TS9 is operated, an operating path is completed for relay 15–HC through make contact 9–C1–1, the make contact of contacts 9–TS9–1 and break contact 9–TS8–1. The operation of relay 15–HC, in turn, extends the leads connected to segments 1 through 4 on distributor 305 through cable 314 and make contacts 1 through 4 of relay 15–HC to the hundreds digit coding circuit, generally indicated by block 315.

Coding circuit 315 functions to extend lead 311 to selected ones of leads 1 through 4 whereby distributor 305 is coded with an appropriate digit. This is accomplished, as shown in detail in block 315, by the several contacts of relays 15–HL1 through 15–HH3. As previously described, the first digit of the first address registered on relays 10–1A through 10–1F is stored on relays 15–HL1 through 15–HH3 upon the operation of relay 13–AC1.

Assuming now that the first digit is the digit 1, relays 10–1A and 10–1D are operated and thus corresponding relays 15–HL1 and 15–HH1 are operated. This, thus, extends lead 311 through make contact 15–HL1–1 in coding circuit 315 and the break contact of contacts 15–HH2–1 to the first segment of distributor 305 by way of a make contact of relay 15–HC. Accordingly, distributor 305 during the ninth revolution thereof transmits the digit corresponding to the first digit of the addressee station.

Similarly, if the first digit is the digit 3, for example, relays 15–HL1 and 15–HH3 are operated. This extends lead 311 to the first segment of distributor 305, as previously described, and to the second segment of distributor 305 by way of make contact 15–HL1–2 and the break contact of contacts 15–HH1–1. In the event that the digit 7 constitutes the first digit, relays 15–HL3 and 15–HH1 are operated. This then extends lead 311 to the first segment of distributor 305 by way of make contact 15–HL3–2 and the break contact of relay 15–HH2–1, to the second segment by way of make contact 15–HL3–1, diode DD8 and the make contact of contacts 15–HH1–1 and to the third segment by way of make contact 15–HL3–1, diode DD9 and the make contact of contacts 15–HH1–2. In a corresponding manner, any other digit stored by relays 10–1A through 10–1F which operate corresponding ones of relays 15–HL1 through 15–HH3 code distributor 305 with the appropriate digit. It is thus seen that during the ninth revolution of the distributor, the first digit of the addressee station is transmitted.

During the tenth revolution of distributor 305 relay 9–TS10 is operated, as previously described. With relay 9–TS10 operated, relay 15–HC is released and an operating path is completed for relay 15–TC by way of make contact 9–C1–2, the make contact of contacts 9–TS10–1, the break contact of contacts 9–TS9–1 and break contact 9–TS8–1. With relay 15–TC operated, distributor segments 1 through 4 of distributor 305 are extended to tens digit coding circuit 316 by way of cable 314 and make contacts 1 through 4 of relay 15–TC.

Coding circuit 316 is arranged in substantially the same manner as coding circuit 315 with the exception that the contacts therein constitute the contacts of relays 15–TL1 through 15–TH3. Since relays 15–TL1 through 15–TH3 are selectively operated in accordance with the second digit of the addressee station, lead 311 is extended to the segments of distributor 305 to code the distributor with the second digit in substantially the same manner as previously described with respect to coding circuit 315. Accordingly, during the tenth revolution of distributor 315, the second digit of the addressee station is transmitted.

During the eleventh revolution of distributor 305 relay 9–TS11 operates, releasing relay 15–TC and completing the operating path for relay 15–UC by way of make contact 9–C1–3, the make contact of contacts 9–TS11–1 and the break contacts of relays 9–TS–10, 9–TS–9 and 9–TS–8. With relay 15–UC operated, the segments of distributor 305 are now extended to units digit coding circuit 317, which coding circuit constitutes the contacts of relays 15–UL1 through 15–UH3. Accordingly, since relays 15–UL1 through 15–UH3 are selectively operated in accordance with the third digit of the addressee station, distributor 305 transmits the third digit during the eleventh revolution.

During the twelfth revolution of distributor 305, relay 9–TS12 operates, releasing relay 15–UC and completing an operating path for relay 15–OA by way of make contact 9–C1–4, the make contact of contacts 9–TS12–1 and the break contacts of relays 9–TS8 through 9–TS11, operating relay 15–OA which locks by way of its own make contact and lead 1502 to the ground on the winding of relay 9–STM. With relay 15–OA operated, the operating path for relay 13–AC1 is opened and this relay releases. In addition, the ground on lead 1301 is transferred through the make contact of contacts 15–OA–1 to the winding of relay 13–AC–7. The release of relay 13–AC1 together with the operation of relay 13–AC7 transfers the leads extending to the winding of relays 15–UL1 through 15–HH3 to the relay windings in home address register 1201 by way of contacts 1 through 18 of relay 13–AC7. Accordingly, relays 15–UL1 through 15–HH3 selectively operate in accordance with the three digits of the home address in substantially the same manner as they previously operated when leads L1 through L4 and H1 through H3 extended to register 1009.

During the thirteenth revolution of distributor 305 relay 9–TS13 operates, completing the operating path for relay 15–HC through make contact 9–C1–1, the make contact of contacts 9–TS13–1 and the break contacts of relays 9–TS8 through 9–TS12. This re-extends the segments of distributor 305 to coding circuit 315 and since relays 15–HL1 through 15–HH3 are operated in accordance with the first digit of the home address, this digit is transmitted during the thirteenth revolution of distributor 305.

During the fourteenth revolution of distributor 305, relay 9–TS14 operates, releasing relay 15–HC and operating relay 15–TC by way of make contact 9–C1–2, the make contact of contacts 9–TS14–1 and the break contacts of relays 9–TS8 through 9–TS13. Accordingly, the segments of distributor 305 are extended to coding circuit 316 whereby the tens digit of the home address is transmitted during the fourteenth revolution of distributor 305.

During the fifteenth revolution of distributor 305 relay 9–TS15 operates, releasing relay 15–TC and operating relay 15–UC by way of make contact 9–C1–3, make contact 9–TS15–1, and the break contacts of relays 9–TS8 through 9–TS14. This extends the segments of distributor 305 through coding circuit 317 whereby the third digit of the home address is transmitted during the fifteenth revolution of distributor 305.

During the twenty-first revolution of distributor 305, relay 9–TS21 operates, as previously described. With relay 9–TS21 operated, lead 311 is directly connected to lead 310 by way of break contact 9–TS5–1, the break contact of contacts 9–TS6–1, break contact 9–TS16–1, the break contact of contacts 9–TS17–1, break contact 9–TS20–2, make contact 9–TS21–4 and make contact 1–OG–6. Accordingly, during the twenty-first revolution of distributor 305, the output thereof is shorted and the character is thus suppressed.

At the conclusion of the twenty-first revolution of distributor 305, relay 9–EAB operates, as previously described. The operation of relay 9–EAB again recompletes the operating paths of relays 9–EA and 9–EAA and with relay 9–EA operated, ground is removed from the winding of relay 9–STM and in addition thereto, from the winding of relay 15–OA and these latter two relays release. In addition, with relay 9–EA operated, the operating path of relay 13–AC7 is opened and relay 13–AC7 released disconnects address register 1201 from relays 15–UL1 through 15–HH3.

Returning now to relay 9–EA operated, the previously-described operating path for relay 9–APB is now opened and with relay 9–APB released, relays 9–ABC and 9–C1 release and the answer back sequence is terminated.

The operation of relay 9–EA now completes the energizing path for relay 7–PR in the magnetic recorder control circuit shown in FIG. 7. This path may be traced through break contact 17–ALM–1, the make contact of contacts 8–ORD–2, the make contact of contacts 9–EA–5, the winding of relay 7–PR and rewind limit switch 711. Accordingly, relay 7–PR operates and locks by way of forward limit switch 720, make contact 7–PR–2 and diode DD5. In addition, forward solenoid 712 is energized over the same path as previously described for relay 7–PR with the exception that this path is completed by way of diode DD4 and the solenoid winding in shunt to the winding of relay 7–PR.

The closure of make contact 7–PR–2 also completes the operating path for relay 7–AR. Relay 7–PR operated also completes an obvious energizing path for relay 7–RPB and relay 7–RPB, in turn, extends ground through make contact 7–RPB–1, break contact 18–A1–1 and the make contact of contacts 9–EA–5 to the winding of relay 7–PR to hold the latter relay operated. In addition, relay 7–PR operated completes the energizing path for motor 715 by way of make contact 7–PR–3.

With forward solenoid 712 and motor 715 energized, the magnetic record is again advanced past the reading and recording head 718. With relay 7–AR operated, reading head 718 is connected to the winding of repeat coil RCC through the make contact of contacts 7–AR–2, amplifier 717 and the make contact of contacts 7–AR–1, whereby recorder head 718 applies the signals read from the magnetic record to repeat coil RCC.

As the magnetic record advances, rewind limit switch 711 operates, recompleting the operating path for relay 7–ADR. Relay 7–ADR, in turn, recompletes the operating paths for relays 7–RON and 7–RONA and relay 7–RONA operated connects repeating coil RCC to repeating coil RCA. With relay 8–TR operated, this path is traced, in part, from conductor T2 to coil RCC via make contact 7–RONA–1, the make contact of contacts 8–TR–6 and the make contact of contacts 8–TR–7 thus removing filter 716 from the connecting path. Accordingly, the message on the magnetic record is played back and transmitted to the addressee station.

During the message play-back, with relay 7–RON operated, an operating path is completed for relay 8–MDS through make contact 7–RON–4, the make contact of contacts 7–RPB–2 and thermistor 801 operating relay 8–MDS which locks by way of its own make contact and make contact 17–RS–5. With relay 8–MDS operated, the output of modulator 212 in data set 204 is shunted to ground through capacitor CP6 and make contact 8–MDS–2. Accordingly, during the message play-back signals from data set 204 are suppressed.

At the termination of the play-back of the recorded message the end-of-message signal and the following disconnect signal are transmitted to the first addressee. Upon the detection thereof, the first addressee station returns a disconnect signal and disconnects from the connection.

Timer 210 of data set 204 proceeds to time the disconnect signal which is detected by discriminator 209. After a predetermined interval, timer 210 operates relay 2–S resulting in the release of relay 2–CY which, in turn, releases relay 2–CYD. With relay 2–CYD released, the previously-described operating path for relay 8–EMC is recompleted and relay 8–EMC, in turn, operates relay 8–EM. With relay 8–EMC operated, relay 8–CYA is released. In addition, relay 8–EMC operated recycles the timing circuit by reapplying positive battery to capacitor CP5 by way of make contact 8–EMC–8.

The operation of relay 8–EM with relay 4–1CS operated removes the ground applied by way of lead 1602 to lead 1601 whereby relay 16–1UK releases, together with the operated ones of the register relays in first address register 1009. In addition, relay 8–EM operated releases relay 8–ORD and opens the operating path of relay 1–A. This also releases relay 1–RA. Relay 8–EM released also releases relays 8–SOP and 17–RS and relay 17–RS, in turn, releases relay 17–TP5 thus recompleting the operating path of relay 17–TP3. Accordingly, a new timing period will be initiated upon the release of relay 8–EMC.

With relay 8–ORD released, relay 1–OG releases. The multiple address circuit is thus disconnected from the outgoing line circuit.

When the magnetic record of the recorder has advanced to the forward limit of its travel, switch 720 operates, removing battery from the winding of relay 7–PR and 7–AR and these relays release. In addition, the operation of forward limit switch 720 opens the energizing path of forward solenoid 712. With relay 7–PR released, relay 7–RPB releases, releasing, in turn, relay 8–MDS. In addition, the release of relay 7–PR completes the operating path for rewind solenoid 719. Accordingly, the magnetic record is returned to the initial or home position.

Figure 18:
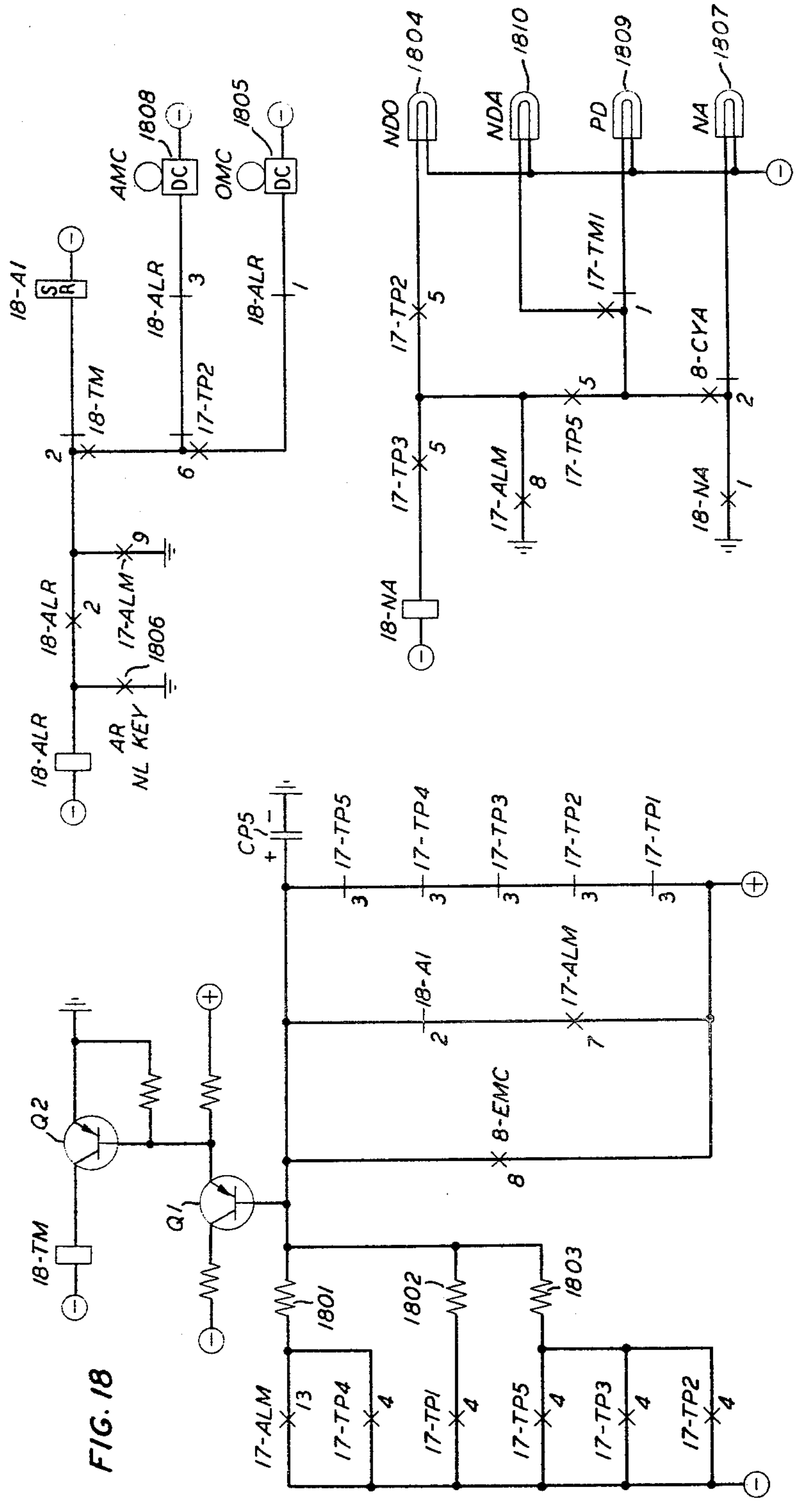

At the home position, rewind limit switch 711 releases, de-energizing rewind solenoid 719 and releasing relay 7–ADR. The release of relay 7–ADR de-energizes motor 715 and releases relays 7–RON and 7–RONA. Relay 7–RON released, releases, in turn, relays 9–EA, 9–EAA and 8–EMC. With relay 8–EMC released and relay 7–TP3 operated, the operation of the timer circuit shown in FIG. 18 is initiated. In addition, relay 8–EMC released, releases relay 8–EM. This permits the reoperation of relays 9–STM and 8–ORD. Relay 8–ORD reoperated recompletes the operating path of relay 1–OG whereupon the connection to the outgoing line circuit is re-established and a register is again requested as previously described. In addition, with relay 8–ORD reoperated, ground is reapplied to lead 1301 and thence by way of the break contact of contacts 15–OA–1, the break contact of contacts 16–1UK–4 and the make contact of contacts 11–2UK–3 to the winding of relay 13–AC2. With relay 13–AC2 operated, leads (H)L1 through (U)H3 are extended by way of cable 1501 and make contacts 1 through 18 of relay 13–AC2 in FIG. 11 to second address register 1101. Accordingly, relays 15–UL1 through 15–HH3 are selectively operated in accordance with the digit designations of the second addressee.

*Outpulsing and message play back to subsequent addressees*

When the register is attached, the D-C connection of the trunk circuit is re-established with relay 1–OG operated and relay 1–A consequently reoperates. This recompletes the operating path of relay 1–RA and relay 1–RA, in turn, recompletes the operating path of relay 4–P. The operation of relay 4–P again completes the operating path for relay 4–P1, and when the latter relay operates, the ground applied through make contact 4–P1–2 is extended through the make contact of contacts 4–1CS–10, the break contact of contacts 16–1UK–2, lead 505, the make contact of contacts 11–2UK–1 and the break contact of contacts 5–2AS–9 to the winding of relay 5–2AS which operates and locks, as previously described. Relay 5–2AS operated also transfers the holding path of relay 4–1CS to lead 402, as previously described.

With relay 4–P1 operated, the windings of relays 14–L1 through 14–H1 are again extended to the first address register. However, since the first address register relays have been released, none of relays 14–L1 through 14–H3 is operated, precluding the transmission of a multifrequency digit by oscillator 1303.

The operation of relay 4–P1 also opens the operating path of relay 4–P and when the latter relay releases, relay

4–P1 releases, in turn, opening the holding path of relay 4–1CS. With relay 4–P1 released, relay 4–P reoperates, resulting in the reoperation of relay 4–P1.

The reoperation of relay 4–P1 again extends ground through make contact 4–P1–2 and then via the break contact of contacts 4–1CS–10, lead 506, the make contact of contacts 5–2AS–10 and the break contact of contacts 5–2BS–9 to the winding of relay 5–2BS which operates and locks, as previously described. In addition, relay 5–2BS transfers the holding path of relay 5–2AS to lead 402.

With relay 4–P1 operated, the windings of relays 14–L1 through 14–H3 are again extended through cable 202 and thence to second address register 1101 by way of make contacts 2 through 7 of relay 5–2AS. Accordingly, selected ones of relays 14—L1 through 14–H3 are operated, controlling oscillator 1303, in turn, to transmit a multifrequency digit corresponding to the first digit of the second address.

The operation of relay 4–P1 also opens the operating path of relay 4–P and when the latter relay releases, relay 4–P1 releases, in turn. This releases relay 5–2AS and recompletes the operating path of relay 4–P. Accordingly, relay 4–P1 reoperates, recompleting the operating path of relay 5–2CS by way of make contact 4–P1–2. Thus the windings of relays 14–L1 through 14–H3 are re-extended to the second address register 1101 and the second digit is transmitted by oscillator 1303.

In a similar manner, the next operation of relay 4–P1 operates selected ones of relays 14–L1 through 14–H3 in accordance with the third digit, which digit is transmitted by oscillator 1303. In addition, the ground through make contact 4–P1–2 is extended by way of lead 506, the make contact of contacts 5–2CS–10, and the make contact of contacts 11–2UK–2 to lead 503 and thence to the winding of relay 4–SOP, as previously described. This again opens the operating path of relay 4–P, terminating the transmission of the second address.

When the second addressee answers, relay 2–CYD operates, as previously described, operating, in turn, relay 8–CYA. This again releases relay 17–TP3, whereupon relay 17–TP4 operates and the addressee answer back is absorbed, as previously described. Thereafter, relay 18–TM operates, as previously described, operating, in turn, relays 17–RS, 17–TP5 and 9–ABP. With relay 9–ABP operated, the answer back circuit is again restarted and the answer back sequence is transmitted to the second addressee. At this time, relays 15–UL1 through 15–HH3 are selectively operated in accordance with the second address whereby this address is transmitted during the ninth, tenth and eleventh revolution of distributor 305.

At the end of the answer back, relay 9–EAB operates, operating, in turn, relay 9–EA which operates relay 7–PR, as previously described. This initiates the message play back to the second addressee and at the termination thereof the second addressee transmits the disconnect signal, releasing relay 2–CYD which operates relay 8–EMC and relay 8–EM, in turn. The operation of relay 8–EM opens break contact 8–EM–10, FIG. 11, thereby releasing the second address register relays. In addition, relay 8–EM operated releases relay 8–ORD and relay 1–OG releases, in turn, disconnecting the multiple address trunk circuit from the outgoing line circuit.

Upon the subsequent restoration of the recorder to the initial position, relay 8–EMC is released, as previously described, releasing, in turn, relay 8–EM. As previously described, the release of relay 8–EM reoperates relay 8–ORD, reoperating, in turn, relay 1–OG. Accordingly, a register is again requested, and when the register is attached, the digits of the third addressee are transmitted thereto in substantially the same manner as previously described with respect to the second address. When the third addressee answers, his answer back is absorbed. The multiple address answer back is transmitted followed by the message play-back and at the end of the message the register relays of the third address register are released.

In substantially the same manner, the fourth, fifth and sixth addressees are called and the message is played back thereto. It is noted that prior to the calling of the sixth addressee, relay 13–AC6 is operated by way of the make contact of contacts 11–6UK–1 and the break contacts of the previous UK relays. This, therefore, extends the windings of relay 15–UL1 through 15–HH3 through cable 1501 and make contacts 1 through 18 of relay 13–AC6 to the windings of the register relays in the sixth address register 1102. Accordingly, the sixth addressee is called, the answer back from the addressee is absorbed and the multiple address answer back includes the address of the sixth addressee.

After the mesage play back to the sixth addressee and the reception of the disconnect signal, relay 2–CYD releases, operating relay 8–EMC and relay 8–EM, in turn. This releases the sixth address register relays and disconnects the multiple address circuit from the outgoing line circuit. When the recorder returns to its initial condition, relay 8–EMC releases, releasing, in turn, relay 8–EM, as previously described, whereupon a register is again requested and when the register is attached, relay 4–P operates, operating in turn, relay 4–P1. The operation of relay 4–P1 again initiates the transmission of the address digits. This time relays 6–7AS, 6–7BS and 6–7CS are successively operated, whereby the digits of the home address are transmitted. In addition, upon the transmission of the third digit, the ground applied to lead 506 by relay 4–P1 is extended to lead 503, operating relay 4–SOP to terminate the transmission of the digits of the home addressee.

When the original calling subscriber answers to operate relay 2–CYD the answer back is absorbed in the same manner as previously described. The subsequent operation of relay 17–TP5 operates relay 9–APB and the multiple address answer back is transmitted. It is noted that prior thereto, relay 13–AC7 was operated by way of make contact 12–7UK–4. Accordingly, this relay remains operated prior to and subsequent to the operation of relay 15–OA whereby the digits of the calling subscriber are transmitted during the ninth, tenth and eleventh revolutions and again during the thirteenth, fourteenth and fifteenth revolutions.

After the transmission of the answer back, the message is played back and at the termination thereof, the disconnect signal is received to release relay 2–CYD. The release of relay 2–CYD operates, in turn, relay 8–EM. This releases the relays of home address register 1201 which includes relay 12–7UK. In addition, relay 4–SOP releases. With relay 12–7UK released, an operating path is completed for relay 2–EC by way of lead 210, make contact 8–EM–11, FIG. 8, and the break contact of contacts 12–7UK–3 operating relay 2–EC which locks by way of its own make contact and make contact 8–ON–17. With relay 12–7UK released, and relay 2–EC operated, the previously described holding path for relay 8–ON is opened and this relay releases.

Relay 8–ON released, opens the locking paths of relays 8–TR, 4–BSA, 4–S1, 6–ST and 6–7CS, releasing these relays. The release of relay 8–TR releases, in turn, relay 8–TRA.

When the recorder restores, releasing relays 7–RON and 7–RONA, relay 8–EMC releases, followed by the release of relays 8–EM and 2–EC. In addition, the release of relay 8–EMC, with relay 8–ON released, removes ground from the sleeve lead S indicating that the multiple address circuit has returned to the idle condition. The multiple address circuit is now ready to receive a call from another subscriber.

It is noted that in the event that less than six addressees are to be called, the home addressee station is always called immediately following the last addressee. Assuming, for example, that two addressee stations are to be called, only relays 16–1UK, 11–2UK and 12–7UK of the UK relays are operated, as previously described. In addition, only the address relays of registers 1009, 1101 and 1201 are operated. Accordingly, after the termination of the playback to the second addressee and the subsequent disconnect and rerequest of a register, the ground applied by relay 4–P1 to lead 506 is extended by relay 5–2CS to lead 505, as previously described. In this event, since relays 11–3UK through 11–6UK are released, this ground is further extended through address count circuit 502, the intermediate count circuits and address circuit 508 and thence by way of lead 505 and make contacts of relays 8–TR and 12–7UK to the winding of relay 6–7AS. Accordingly, the home address digits are transmitted immediately following the termination of the playback to the second addressee. The transmission of the message to the home address then proceeds in the same manner as previously described.

*Timing and alarm features*

The multiple address circuit is arranged to provide corrective action or raise an alarm in the event that an improper procedure is followed. For example, in the event that the calling subscriber should disconnect prior to the completion of dialing, the D-C path through the trunk circuit is open, releasing relay 1–A. This, in turn, releases relay 1–ANS. With relay 1–ANS released, the operating path for relay 8–ON is open. The consequent release of relay 8–ON releases the operated ones of the multiple address relays restoring the circuit to the initial idle condition and removing the busy ground applied to the sleeve lead.

As previously disclosed, a timing circuit is also provided for timing the interval between the seizure of the multiple address circuit and the completion of dialing. This function is provided by the previously-described operation of relay 17–TP1.

In the event that the dialing is not completed within the appropriate interval, with relay 17–TP1 operated, providing a charging path for capacitor CP5, FIG. 18, through resistor 1802, make contact 17–TP1–4, transistor Q1 and transistor Q2, in turn, are rendered conductive, operating relay 18–TM. The operation of relay 18–TM completes an operating path for relay 17–RCP through the make contact of contacts 17–TP1–5, break contact 8–EMC–7, diode DD7 and make contact 18–TM–1 operating relay 17–RCP which locks through its own make contact and make contact 8–ON–16.

The operation of relay 17–RCP extends ground to the winding of relay 2–AN in data set 204 by way of break contact 2–EC–4 and make contact 17–RCP–4. With relay 2–AN operated, relay 2–CY operates, operating, in turn, relay 2–CYD. In addition, the operation of relay 2–AN initiates the transmission of the "hand shaking" sequence by data set 204.

Relay 2–CYD operated now extends ground to the winding of relay 2–S by way of lead 218, make contact 17–RCP–5, FIG. 8, and make contact 2–CYD–5. As a result of the operation of relay 2–S data set 204 at the termination of the "hand shaking" sequence sends the disconnect signal to advise the calling subscriber data set to disconnect. In addition, with relay 2–S operated, relay 2–CY releases, releasing, in turn, relay 2–CYD. The subsequent disconnect of the calling subscriber then releases relay 1–A and relays 1–ANS and 8–ON release, in turn. This restores the multiple address circuit to the initial idle condition.

The multiple address circuit is also arranged to provide corrective action in the event that the calling subscriber disconnects prior to the completion of the tranmission of the multiple address answer back sequence. It is recalled that relay 9–EA is released prior to the completion of this answer back. Accordingly, in the event that the calling subscriber should disconnect, the release of relay 1–A and the consequent release of relay 1–ANS together with the detection of the simulated space signal due to the subscriber release and the consequent operation of relay 2–S and completes an operating path for relay 2–EC by way of break contact 8–TRA–6, the break contact of contacts 9–EAA–1, break contact 8–OC–2, and make contact 2–S–1 operating relay 20EC which locks by way of lead 210, make contact 2–EC–3, FIG. 8, and make contact 8–ON–17. Accordingly, with relay 2–EC operated and relay 1–ANS released, relay 8–ON releases. In addition, with relay 2–S operated, relay 2–CY releases, releasing in turn relay 2–CYD. This opens the operating path of relay 7–RR, restoring the magnetic recorder to the initial position, as previously described. The operation of relay 2–EC also opens the operating path of relay 2–ANS and the latter relay releases. This forces the release of relay 2–S, releasing, in turn, relay 2–EC. Since relay 8–ON is previously released, the multiple address circuit is restored to the initial idle condition. It is further noted herein that the operation of relay 2–S controls data set 204 to send the disconnect signal in the event that the calling subscriber had not, in fact, disconnected from the line.

The multiple address circuit also times the duration of the received message by operating relay 17–TP2, as previously described. In the event that the received message exceeds a predetermined interval or no disconnect is received from the calling subscriber prior to the termination of that interval, capacitor CP5 is provided a sufficient charge by way of resistor 1803 and make contact 17–TP2–4 to successively turn on transistors Q1 and Q2 and thereby operate relay 18–TM. With relay 18–TM operated, ground is passed through make contact 18–TM–1, FIG. 17, diode DD7, break contact 8–EMC–7, the break contact of contacts 17–TP1–5, the break contact of contacts 17–TP4–5, thermistor 1701 and break contact 8–EMC–9 to the winding of relay 17–ALM which locks by way of its own make contact, break contact 8–EM–9 and make contact 8–ON–16.

The operation of relay 17–ALM completes a discharge path for capacitor CP5 by way of break contact 18–A1–2 and make contact 17–ALM–7. In addition, relay 17–ALM operated completes a supplementary charging path for relay CP5 by way of resistor 1801 and make contact 17–ALM–13.

Relay 17–ALM operated also opens the previously-described operating path for relay 7–RR and in addition thereto, opens the energizing path for forward solenoid 712. With relay 7–RR released, the previously-described energizing path for rewind solenoid 719 is completed and the magnetic recorder proceeds to restore to the initial position, as previously described.

When relay 7–RR releases, an operating path is completed for relay 8–OC via make contact 2–CYD–7, make contact 17–TP2–7, make contact 7–RON–5 and break contact 7–RR–5, operating relay 8–OC which locks by way of its own make contact and break contact 8–EMC–10. The operation of relay 8–OC, in turn, extends ground to lead 218 whereby relay 2–S is operated, thus sending the disconnect signal to the calling subscriber. In addition, with relay 2–S operated, relay 2–CY releases, releasing, in turn, relay 2–CYD.

Returning now to the alarm circuit, the operation of relay 17–ALM completes an energizing path for NDO lamp 1804 by way of make contact 17–TP2–5 and make contact 17–ALM–8. In addition, relay 17–ALM operated completes an operating path for relay 18–A1 through the break contact of contacts 18–TM–2 and make contact 17–ALM–9. This opens the discharge path of capacitor CP5, permitting the capacitor to charge through resistors 1801 and 1803. Accordingly, relay 18–TM is reoperated, releasing relay 18–A1 and completing an energizing path for OMC chime 1805 by way of break contact 18–ALR–1, the make contact of contacts 17–TP2–6, the make contact of contacts 18–TM–2 and make contact 17–ALM–9.

When slow-to-release relay 18–A1 releases, capacitor CP5 is again discharged, recycling the timing circuit and relay 18–TM is again discharged, recycling the timing circuit and relay 18–TM is again released. This de-energizes chime 1805 and reoperates relay 18–A1. Accordingly, the timer is again restarted and this recycling operation provides repetitive energizing of chime 1805, calling the attendant's attention to an improper procedure. Since chime 1805 is operated, together with the energization of lamp 1805, an over-capacity incoming message is indicated.

The attendant may release the alarm by operating key 1806. This completes an obvious operating path for relay 18–ALR which locks through its own make contact and make contact 17–ALM–9. Relay 18–ALR operated, then opens the energizing path for chime 1805.

To determine the identity of the calling subscriber, the attendant may operate key 1307, FIG. 13. This extends ground to make contacts of relays 15–HL1 through 15–UH3. In addition, ground is extended through key 1307 and make contact 17–ALM–11 to the winding of relay 13–AC7. As previously described, with relay 13–AC7 operated, relays 15–HL1 through 15–UH3 are selectively operated in accordance with the digits of the calling subscriber. Accordingly, the ground extended to the make contacts of relay 15–HL1 through 15–UH3 is selectively passed to a display circuit, generally indicated by block 1306, which display circuit may conveniently comprise a matrix of lamps individually operated by the application of ground to the several leads extending to display 1306, as is well known in the art. In addition, the attendant may determine the identity of the first addressee by the operation of key 1305. This extends ground through make contact 17–ALM–10 to the winding of relay 13–AC1. Accordingly, relays 15–HL1 through 15–UH3 are operated in accordance with the digits of the first address and the ground extended through key 1305 and the make contacts of the operated ones of relays 15–HL1 through 15–UH3 light the appropriate lamps in display 1306.

The attendant may advance the circuit whereby the multiple address circuit calls the first addressee. This is provided by the operation of key 803, extending ground therethrough and through the make contact of contacts 17–ALM–2 to the winding of relay 8–EMC. With relay 8–EMC operated, the locking paths of relay 17–ALM and 8–OC are open, and these relays release, releasing, in turn, relay 18–ALR if it is operated. In addition, with relay 2–S operated, the previously-described operating path for relay 8–TR is completed. This releases relay 2–AN and operates relay 2–OR. Accordingly, the multiple address circuit is advanced to call the first addressee in the same manner as previously described.

As previously described, relay TP3 operates after the completion of each call to time the interval required to effect the connection with the next addressee station. It is noted here that as described in the above-identified application of R. M. Green et al., in the event that a called station is busy, the call is switched to an intercept position and thereby completed to an intercept data set, whereby the call may proceed in the same manner as if the call had been completed to the called station. A failure to complete the call may occur, however, where the called station is out of service or the address digits constitute an invalid number. In this latter event, with relay 17–TP3 operated, capacitor CP5 charges by way of make contact 17–TP3–4 and resistor 1803. Accordingly, relay 18–TM operates, as previously described, completing the operating path for relay 17–ALM through make contact 18–TM–1. Relay 17–ALM operated locks in the same manner as previously described, and recycles the timer circuit to release relay 18–TM. In addition, with relay 18–TM operated, the operating path for relay 1–OG is open, opening, in turn, the D-C connection of the trunk circuit, whereby relay 1–A releases.

Returning now to relay 17–ALM operated, an operating path is completed for relay 18–NA by way of make contact 17–TP3–5 and make contact 17–ALM–8. The operation of relay 18–NA completes an energizing path for NA lamp 1807 by way of the break contact of contacts 8–CYA–2 and make contact 18–NA–1. In addition, with relay 17–ALM operated and relay 18–TM released, relay 18–A1 operates, as previously described. With relay 18–A1 operated, the charging of capacitor CP5 is restarted, as previously described, resulting in the subsequent operation of relay 18–TM.

The operation of relay 18–TM completes an energizing path for AMC chime 1808 by way of break contact 18–ALR–3, break contact 17–TP2–6 and the make contacts of relays 18–TM and 17–ALM. In addition relay 18–TM operated releases relay 18–A1 whereby the timer is recycled and relay 18–TM is released, as previously described. The release of relay 18–TM recompletes the operating path for relay 18–A1 and opens the energizing path for chime 1808. With relay 18–A1 reoperated, the operation of the timer is restarted and this cycling operation continues to periodically energize chime 1808. With lamp 1807 and chime 1808 energized, the attendant is advised of the failure to complete the call.

To release the chime alarm, the attendant may operate key 1806 which, as previously described, operates, in turn, relay 18–ALR. This opens the energizing path for chime 1808.

The attendant may also determine the addresses of the calling and called stations. The operation of key 1307 extends ground to the make contacts of relays 15–HL1 through 15–UH3, as previously described, thereby setting up a display of the home address in display circuit 1306 since the ground through key 1307 is also extended through make contact 17–ALM–11 to the winding of relay 13–AC7 and relay 13–AC7, in turn, functions to code relays 15–UL1 through 15–HH3 with the home address, as previously described. Similarly, the operation of key 1305 extends ground through make contact 17–ALM–10 to the 13–AC relay winding corresponding to the called station. Accordingly, the leads extending to display circuit 1306 will be energized in accordance with the called station address to visually display the address.

If the attendant desires to advance the circuit to the next addressee station, key 803 is operated, operating, in turn, relay 8–EMC, as previously described. With relay 8–EMC operated, a PBX register is again requested and the circuit initiates a call to the next station in the same manner as previously described.

The circuit will provide an alarm in the event that the called subscriber disconnects during the interval while the multiple address circuit is absorbing the called subscriber answer back. During this interval, as previously described, relay 17–TP4 is operated and the data set is presently receiving the marking and spacing signals comprising the called station answer back. If, at this time, the called station disconnects, these signals terminate and the termination of the signals appear as a simulated disconnect signal, operating relay 2–S. With relay 2–S operated, relay 2–CY releases, releasing, in turn relay 2–CYD. The release of relay 2–CYD releases relay 17–TP4 releasing, in turn, relay 17–TMC and thereby reoperating relay 17–TP3. In addition, with relay 2–CYD released, ground is applied through break contact 2–CYD–6, FIG. 17, make contact 8–CYA–3, thermistor 1701 and break contact 8–EMC–9 at the winding of relay 17–ALM. Accordingly, relay 17–ALM operates and locks, as previously described.

With relay 17–ALM operated, relay 1–OG releases, opening the D-C connection of the trunk circuit and thereby releasing relay 1–A. In addition, relay 17–ALM operated, recycles the timer circuit and thus releases relay 18–TM.

With relay 17–TP3 operated, the operation of relay 17–ALM recompletes the operating circuit for relay 18–NA. This extends ground to PD lamp 1809 by way of make contact 18–NA–1, the make contact of contacts 8–CYA–2 and the break contact of contacts 17–TM1–1. In addition, with relay 18–TM released and relay 17–ALM operated, the previously-described operating path for relay 18–A1 is completed, thereby restarting the timer circuit and reoperating relay 18–TM when the timing circuit times out. This completes the previously-described energizing path for chime 1808 and releases relay 18–A1, as previously described. Accordingly, the timer circuit is recycled, relay 18–TM is released, chime 1808 is deenergized and relay 18–A1 is reoperated, thus providing the recycling operation.

The attendant, upon observing the alarm condition, may release the chime alarm by the operation of key 1806 which operates, in turn, relay 18–ALR as previously described. In addition, the attendant may determine the identity of the called and calling subscribers by observing display 1306 and operating keys 1307 and 1305, respectively, as previously described. The operation of key 803 operates relay 8–EMC to advance the circuit to call the next subscriber in the same manner as previously described. In this event relay 8–EMC is held via make contact 4–SOP–3 until relay 4–SOP subsequently releases as previously described.

The circuit also provides a premature disconnect alarm in the event that the called subscriber disconnects prior to the completion of the multiple address answer back. During this interval, relay 17–TP5 is operated, as previously described, and the termination of the received idle marking signal from the called subscriber operates relay 2–S releasing, in turn, relays 2–CY and 2–CYD. With relay 2–CYD released, the previously-described operating path for relay 17–ALM is recompleted and the latter relay locks, as previously described. In addition, relay 17–ALM operated releases relay 1–OG to disconnect the D-C connection of the trunk circuit, thereby releasing relay 1–A. Relay 17–ALM operated also recycles the timer circuit, releasing relay 18–TM. In addition, the operation of relay 17–ALM applies ground to PD lamp 1809 by way of the break contact of contacts 17–TM1–1, make contact 17–TP5–5 and make contact 17–ALM–8. With relay 18–TM operated, relay 18–A1 operates, as previously described, and the cycling operation of the timer circuit and the consequent operation and release of relay 18–TM proceeds. Accordingly, chime 1808 is periodically energized.

The attendant, when advised of the premature alarm condition, may release the chime alarm by the operation of key 1806, as previously described. In addition, the attendant may operate keys 1305 and 1307 to observe the display of the called and calling stations. The operation of key 803 then advances the circuit to call the next subscriber in the same manner as previously described.

The multiple address circuit will also alarm in the event that a disconnect signal is not received from the called subscriber at the termination of the message. In this event, with relay 17–TP5 operated, capacitor CP5 charges sufficiently by way of resistor 1803 and make contact 17–TP5–4 to turn on transistor Q1 whereby transistor Q2 turns on to operate relay 18–TM. With relay 18–TM operated, ground is applied through make contact 18–TM–1, FIG. 17, break contact 17–ALM–12, the winding of relay 17–TM1 and break contact 17–TMC–1 to negative battery, operating relay 17–TM1 which locks through its own make contact and make contact 17–RS–3. In addition, the ground through make contact 18–TM–1 is also applied through diode DD7, break contact 8–EMC–7, the break contact of contacts 17–TP1–5, the break contact of contacts 17–TP4–5, thermistor 1701 and break contact 8–EMC–9 to the winding of relay 17–ALM which locks, as previously described. With relay 17–ALM operated, the timing circuit is recycled, releasing relay 18–TM and relay 1–OG is released, thereby releasing the D-C connection to release relay 1–A.

The operation of relay 17–ALM re-extends ground through make contact 17–TP5–5 and the make contact of contacts 17–TM1–1 to NDA lamp 1810. In addition, the release of relay 18–TM recompletes the operating path for relay 18–A1 initiating the cycling of the timing circuit, as previously described. The subsequent release of relay 18–TM then recompletes the energizing path for chime 1808. With chime 1808 periodically energized and lamp 1810 energized, the attendant is advised of the failure of the called subscriber to send the disconnect.

The operation of relay 17–ALM, with relay 18–A1 operated, also opens the operating and locking path for relays 7–PR and 7–AR. With relay 7–PR released, the magnetic recorder is restored and relay 7–RPB releases. This completes an energizing path for relay 2–S by way of lead 218, make contact 17–RS–6, FIG. 8, the break contact of contacts 7–RPB–2 and make contact 7–RON–4. With relay 2–S operated, relay 2–CYD releases and the circuit is prepared to advance to the next subscriber upon the operation of key 803. It is noted that when key 803 is operated, the subsequent operation of relay 8–EMC operates relay 8–EM to release relay 17–RS. This releases relay 8–MDS and enables data set 204, with relay 2–S operated, to send a disconnect signal. The circuit is thus enabled to call the next subscribed, as previously described.

Although a specific embodiment of the invention has been shown and described, it will be understood that various modifications may be made without departing from the spirit of the invention and within the scope of the appended claims.

What is claimed is:

1. In a multiple address circuit for distributing a data message to a plurality of stations by way of a line switching office, a transmission channel extending to said switching office, a register adapted to store digits of a plurality of station addresses, a message recorder for recording a message, means responsive to the reception of said station addresses from said channel for storing said addresses in said register, means responsive to the storage of said addresses in said register for recording a message received from said channel on said recorder, means responsive to the termination of said received message for providing a service request indication to said switching office by way of said channel, an address counter responsive to the reception of a service available signal from said channel for applying the stored address digits of a first one of said stations to said channel whereby said first station is called, means responsive to the completion of said call for applying said recorded message to said channel, means responsive to the termination of said outgoing message for providing another service request indication, and means responsive to the reception of a subsequent available signal for advancing said counter whereby a second one of said stations is called.

2. In a multiple address circuit for distributing a data message to a plurality of stations by way of a line switching office, an incoming channel and an outgoing channel both extending to said switching office, a register adapted to store digits of a plurality of station addresses, a message recorder including recording means for recording a message on said recorder and reading means for reading the message recorded on said recorder, means responsive to the reception of said station addresses from said incoming channel for storing said addresses in said register, means responsive to the storage of said addresses in said register for enabling said recording means to record a message received from said incoming channel, means responsive to the termination of said received message for providing a service request indication to said switching office by way of said outgoing channel, a sender circuit for transmitting address digits to said switching office by way of said outgoing channel, an address counter responsive to the reception of a service available signal from said outgoing channel for applying the stored address digits of a first one of said stations to said sender circuit whereby said first station is called, means responsive to the completion of said call for enabling said reading means to apply said recorded message to said outgoing channel, means responsive to the termination of said outgoing message for providing another service request indication, and means responsive to the reception of a subsequent available signal for advancing said counter whereby a second one of said stations is called.

3. In a multiple address circuit for distributing a data message to a plurality of stations by way of a line switching office, an incoming channel and an outgoing channel both extending to said switching office, a plurality of registers, each of said registers adapted to store digits of one station address, a message recorder including recording means for recording a message on said recorder and reading means for reading the message recorded on said recorder, means responsive to the reception of said station addresses from said incoming channel for storing said addresses in successive ones of said registers, means responsive to the storage of said addresses in said plurality of registers for enabling said recording means to record a message received from said incoming channel, means responsive to the termination of said received message for providing a service request indication to said switching office by way of said outgoing channel, a sender circuit for transmitting address digits to said switching office by way of said outgoing channel, an address counter responsive to the reception of a service available signal from said outgoing channel for applying the digits stored in the first one of said successive registers to said sender circuit whereby a first one of said stations is called, means responsive to the completion of said call for enabling said reading means to apply said recorded message to said outgoing channel, means responsive to the termination of said outgoing message for providing another service request indication, and means responsive to the reception of a subsequent available signal for advancing said counter whereby a second one of said stations is called.

4. In a multiple address circuit in accordance with claim 3 including answer back means for applying data signals to said outgoing line upon the completion of said call, means responsive to said answer back means for delaying the enabling of said reading means, and further means for coding said answer back means with the addresses stored in said register.

5. In a multiple address circuit for sequentially calling a plurality of stations by way of a line switching office in accordance with the address digits of said stations, a transmission channel extending to said switching office, a plurality of registers, each of said registers including a plurality of storage units for storing said station address digits, a counter having a plurality of stages indirectly associated with each of said registers, each of said stages including a plurality of substages associated with each of said storage units, means effective in response to an incoming call from said channel for storing successive station addresses received from said channel in the storage units of successive ones of said registers, means responsive to the termination of said incoming call for advancing said counter through the plurality of substages of a first one of said stages, means jointly responsive to the advance of said counter through the substages of said one stage and the storage of said station addresses in said associated ones of said storage units of said associated register for transmitting said station addresses stored therein to said channel whereby an outgoing call is initiated to said station, and means responsive to the termination of said outgoing call for advancing said counter, through the plurality of substages of a next successive one of said stages, whereby an outgoing call is initiated to the next successive one of said stations.

6. In a line switching system which includes a plurality of data message stations and a switching office for interconnecting an originating station with an addressee station in response to the reception from said originating station of the address digits designating said addressee station, a multiple address circuit connected to said switching office and arranged to be interconnected with an originating station by said office in response to address digits designating said multiple address station, means in said multiple address circuit rendered effective upon said interconnection thereto for receiving and storing address digits designating a plurality of addressee stations and for receiving and storing a data message, means responsive to the termination of said received message for transmitting to said office the stored address digits designating a first one only of said addressee stations and said stored message, and means thereafter effective upon the termination of the transmission of said stored message for transmitting to said office the address digits designating a subsequent one only of said addressee stations and said stored message.

7. In a line switching system in accordance with claim 6 wherein said means for transmitting the stored address digits designating a first one only of said addressee stations and said stored message is effective to transmit said stored message upon the completion of the interconnection to said first addressee station.

References Cited

UNITED STATES PATENTS

| | | | |
|---|---|---|---|
| 2,912,485 | 11/1959 | Kaufman et al. | 178—4.1 |
| 3,124,643 | 3/1964 | Huffman et al. | 178—3 |

THOMAS A. ROBINSON, *Primary Examiner.*